US007076773B2

(12) United States Patent
Schmidt

(10) Patent No.: US 7,076,773 B2
(45) Date of Patent: Jul. 11, 2006

(54) OBJECT ORIENTED APPARATUS AND METHOD FOR ALLOCATING OBJECTS ON AN INVOCATION STACK IN A DYNAMIC COMPILATION ENVIRONMENT

(75) Inventor: William Jon Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 742 days.

(21) Appl. No.: 09/812,619

(22) Filed: Mar. 20, 2001

(65) Prior Publication Data

US 2004/0015920 A1 Jan. 22, 2004

(51) Int. Cl.
*G06F 9/45* (2006.01)
(52) U.S. Cl. .................. 717/148; 717/151; 717/153
(58) Field of Classification Search ............... 717/114, 717/118, 140, 141, 144, 148, 151, 153, 157
See application file for complete search history.

(56) References Cited

U.S. PATENT DOCUMENTS

| 6,170,083 | B1 * | 1/2001 | Adl-Tabatabai | 717/158 |
| 6,237,141 | B1 * | 5/2001 | Holzle et al. | 717/153 |
| 6,332,216 | B1 * | 12/2001 | Manjunath | 717/141 |
| 6,505,344 | B1 * | 1/2003 | Blais et al. | 717/151 |
| 2002/0178437 | A1 * | 11/2002 | Blais et al. | 717/140 |

OTHER PUBLICATIONS

Whaley et al., "Compositional Pointer and Escape Analysis for Java Programs"; ACM 1999; pp. 187-206.*
Choi et al., "Escape Analysis for Java"; ACM SIGPLAN Conference of Object-Oriented Prgoramming Systems, Languages, and Applications, Nov. 1, 1999; pp. 1-19.*
Alpern et al., "The Jalapeno Virtual Machine"; IBM Systems Journal, vol. 39, No. 1, Feb. 2000; pp. 211-238.*
Burke et al.; "The Jalapeno Dynamic Optimizing Compiler for Java"; JAVA'99, ACM, 1999; pp. 129-141.*
Alpern et al., "Jalapeno—A Compiler-Supported Java Virtual Machine for Servers"; IBM Research; pp. 1-11.*

(Continued)

*Primary Examiner*—Kakali Chaki
*Assistant Examiner*—William H. Wood
(74) *Attorney, Agent, or Firm*—Martin & Associates, LLC; Derek P. Martin

(57) ABSTRACT

An object oriented mechanism and method allow allocating Java objects on a method's invocation stack in a dynamic compilation environment under certain conditions. When a class is dynamically compiled by a just-in-time (JIT) compiler (as the program runs), one or more of its methods may create objects that may be placed on the method's invocation stack. During the compilation of the class, only the information relating to the previously-loaded classes is taken into account. After compilation, as each new class is loaded, the class is analyzed to see if loading the class might change the analysis used to allocate objects on the invocation stacks of previously-compiled methods. If so, the previous object allocations are analyzed in light of the object reference(s) in the newly loaded class, and the previous object allocations are changed from the invocation stack to the heap, if required. In this manner objects may be allocated to a method's invocation stack based on information that is available from the classes that have been loaded, and can then be changed to be allocated from the heap if information in new classes shows that the previous decision (to allocate on the invocation stack) is no longer valid.

10 Claims, 30 Drawing Sheets

OTHER PUBLICATIONS

Alpern et al., "Implementing Jalapeno in Java"; IBM Research, New York; pp. 1-11.*

Blanchet, "Escape Analysis: Correctness Proof, Implmentation and Experimental Results"; ACM 1998; pp. 25-37.*

Menon et al., "The StarJIT Compiler: A Dynamic Compiler for Managed Runtime Environments"; Intel Technology Journal; vol. 7, Issue 1, Feb. 19, 2003; pp. 19-31.*

Grant et al, "DyC: An Expressive Annotation-Directed Dynamic Compiler for C"; Department of Computer Science and Engineering University of Washington; Jan. 30, 1998; pp. 1-20.*

IBM Research, "Programming Languages Day"; Programming Langauges and Software Engineering; Mar. 13, 2000; pp. 1-2.*

* cited by examiner

C++
```
A() {
    Square k;
    ⋮
}
```
FIG. 2A  Prior Art
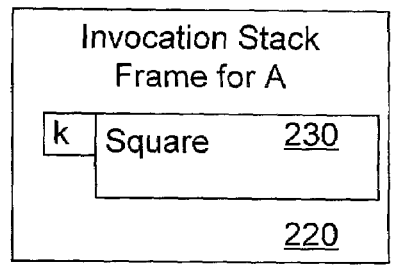
FIG. 2B  Prior Art
Java
```
A() {
    ⋮
    Square k = new Square();
    ⋮
}
```
FIG. 3A  Prior Art
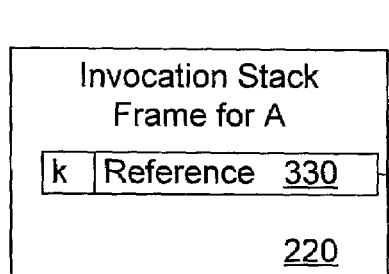
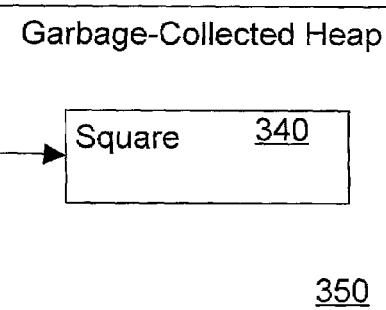
FIG. 3B  Prior Art    FIG. 3C  Prior Art
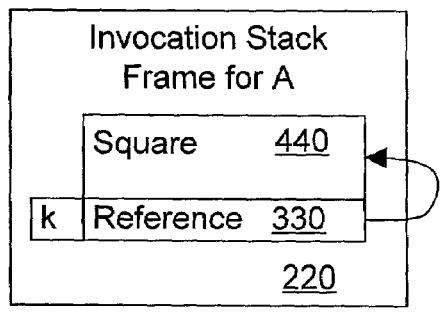
FIG. 4  Prior Art

```
A() {     NO ESCAPE
  •
  •
  •
    Square k = new Square();
  •
  •
  •
}
```

FIG. 5A     Prior Art

```
static Square classVar;
A() {     GLOBAL ESCAPE
  •
  •
  •
    Square k = new Square();
    classVar = k;
  •
  •
  •
}
```

FIG. 5B     Prior Art

```
Square A() {     ARG ESCAPE
  •
  •
  •
    Square k = new Square();
    return k;
  •
  •
  •
}
```

FIG. 5C     Prior Art

```
A(List L) {     ARG ESCAPE
  •
  •
  •
    Square k = new Square();
    L.addToList(k);
  •
  •
  •
}
```

FIG. 5D     Prior Art

```
class ComplexNumber {
    int r;
    int i;
    ComplexNumber(int a, int b) {r=a; i=b;}
    int realPart() {return r;}
    int imagPart() {return i;}
}
```

FIG. 23

```
class GeneralClass {
    static void examine(ComplexNumber c) {}
}
```

FIG. 24

```
class SpecificClass extends GeneralClass {
    static ComplexNumber saveIt;
    static void examine(ComplexNumber c) {saveIt = c;}
}
```

FIG. 25

```
class ExampleClass {
    GeneralClass gCls;
    static void exampleMethod(int a, int b) {
        ComplexNumber cn = new ComplexNumber(a,b);  //A1
        doSomeWork(cn);
        gCls.examine(cn);
    }
    static void doSomeWork(ComplexNumber x) {
        if (x.imagPart() < 0) {
            Class specClass = Class.forName("SpecificClass");
            gCls = (GeneralClass)specClass.newInstance();
        } else {
            gCls = new GeneralClass();  //A2
        }
    } public static void main(String[] argr) {
        int i; j;
        for (i=0;i<100;i++) {
            for (j=0;j<100;j++) {
                exampleMethod(i,j);
            }
        }
        exampleMethod(-1,-1);
    }
}
```

FIG. 26

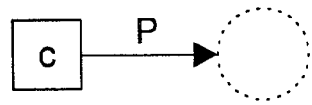
GeneralClass.examine()
FIG. 31
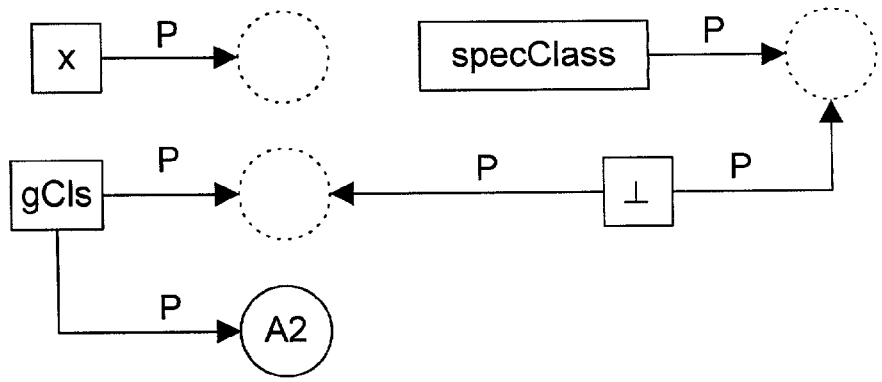
ExampleClass.doSomeWork()
FIG. 32
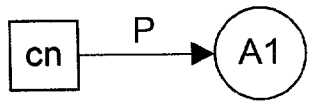
ExampleClass.exampleMethod()
FIG. 33
| Site | Size | Offset |
|------|------|--------|
| A1   | 8    | 64     |
FIG. 34

GeneralClass.examine()

ExampleClass.exampleMethod()

OBJECT ORIENTED APPARATUS AND METHOD FOR ALLOCATING OBJECTS ON AN INVOCATION STACK IN A DYNAMIC COMPILATION ENVIRONMENT

BACKGROUND OF THE INVENTION

1. Technical Field

This invention generally relates to the data processing field. More specifically, this invention relates to the location of object creation in object oriented systems.

2. Background Art

Since the dawn of the computer age, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object oriented programming concepts. The goal of using object oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

The Java programming language developed by Sun Microsystems is one modern object oriented programming language that has become very popular in recent years. From a programmer's point of view, one of the advantages of the Java programming language is that memory allocation and reclamation are handled entirely by the run-time system, which relieves the programmer of the burden of determining how and when to destroy unneeded objects. All objects (other than those of primitive types) are allocated from a common "heap", or section of memory. A garbage collection mechanism then monitors the objects in the heap, and periodically deletes unneeded objects, thereby reclaiming portions of the heap that are occupied by objects that can no longer be accessed from the user's program.

One problem with the Java automatic allocation and reclamation of memory is that users have less control over their program's performance. Each time an object is allocated, a certain cost is incurred as the memory manager updates its data structures. Furthermore, an additional cost must be paid to reclaim the object during garbage collection. Although these costs are small when considered individually, the sheer frequency of object allocation and reclamation result in a significant portion of program execution time being spend in the memory manager, allocating and reclaiming memory for objects.

Java's memory management overhead is far greater than that of the C++ programming language, primarily because every Java object is allocated from the heap. In C++, programmers are given more control over the allocation of their objects. In particular, C++ programmers are able to declare objects to be local to a method. These objects come into existence when the method is invoked, and are automatically reclaimed when the method invocation terminates. Further, the run-time cost of allocating these objects is essentially zero, since they simply occupy space in the method's invocation stack frame. Adding an object to the invocation stack frame simply means that the amount by which the stack pointer is moved must increase, but no additional instructions are required to do this. Compare this with Java, where every created object, no matter how small or how temporary, requires overhead from the run-time memory manager.

Recently, researchers in compiler technology have been working on ways to allocate some Java objects on a method's stack frame, rather than going to the heap for each and every object, thereby improving on the performance of the native Java capabilities. In particular, if a compiler can automatically detect Java objects whose "lifetimes" do not extend beyond the method in which they are created, these objects can be automatically allocated on the stack by the compiler rather than from the garbage-collected heap, resulting in improved performance. The technology used to determine which objects may be allocated on the stack is called "escape analysis". The idea is to determine which objects have lifetimes that do not "escape" from the methods that create them. Escape analysis is presented in a paper by Choi et al., "Escape Analysis for Java", in Proceedings of the Conference on Object Oriented Programming, Systems, and Languages (OOPSLA), Denver, Colo. (November 1999), p. 1–19. Escape analysis as described by Choi et al is limited to allocating objects on a method's stack if their lifetimes do not escape from their creating method.

Recent developments in Java include just-in-time (JIT) compilers. Most JIT compilers can execute a program in two different modes, interpreted mode and compiled mode, and typically begin program execution before the entire program is loaded. In interpreted mode, each Java virtual machine instruction is individually emulated using a pre-written subroutine of native machine instructions. Interpreting Java instructions does not require compilation, but is typically much slower than executing the same Java instruction that has been compiled. In compiled mode, the Java instructions are compiled into machine code. Compiling on-the-fly requires overhead. However, once the compilation has been done, the compiled code can then be executed very quickly. Thus, a JIT compiler typically begins loading and running a program in interpreted mode, and will dynamically compile portions of the code that are frequently executed to improve performance.

Allocating objects onto a stack by a compiler has never been attempted in a dynamic compilation environment. As explained above, performing Choi's escape analysis requires knowledge of the lifetimes of the objects being created. Because programs in a dynamic compilation environment are run in a mixed interpreted/compiled mode, and because classes are dynamically loaded as required when compiling, the lifetime of an object cannot be determined until the entire program has been loaded. For these reasons, escape analysis has not been used in a dynamic compilation environment. Without an apparatus and methods for allocating Java objects to a method's call stack in a dynamic compilation environment, the computer industry will continue to suffer undue performance limitations caused by allocating Java objects from the heap that could be allocated on a method's stack.

DISCLOSURE OF INVENTION

According to the preferred embodiments, an object oriented mechanism and method allow allocating Java objects on a method's invocation stack in a dynamic compilation environment under certain conditions. When a class is dynamically compiled by a just-in-time (JIT) compiler (as the program runs), one or more of its methods may create objects that may be placed on the method's invocation stack. During the compilation of the class, only the information relating to the previously-loaded classes is taken into account. After compilation, as each new class is loaded, the class is analyzed to see if loading the class might change the analysis used to allocate objects on the invocation stacks of previously-compiled methods. If so, the previous object allocations are analyzed in light of the object reference(s) in the newly loaded class, and the previous object allocations are changed from the invocation stack to the heap, if required. In this manner objects may be allocated to a method's invocation stack based on information that is available from the classes that have been loaded, and can then be changed to be allocated from the heap if information in new classes shows that the previous decision (to allocate on the invocation stack) is no longer valid.

The foregoing and other features and advantages of the invention will be apparent from the following more particular description of preferred embodiments of the invention, as illustrated in the accompanying drawings.

BRIEF DESCRIPTION OF DRAWINGS

The preferred exemplary embodiments of the present invention will hereinafter be described in conjunction with the appended drawings, where like designations denote like elements, and:

FIG. 2A is a diagram of C++ pseudo-code;

FIG. 2B is a block diagram showing the object allocation for the C++ code of FIG. 2A in accordance with the prior art;

FIG. 3A is a diagram of Java pseudo-code;

FIGS. 3B and 3C are block diagrams that show the object allocation for the Java code of FIG. 3A in accordance with the prior art;

FIG. 4 is a block diagram showing the allocation of a Java object on an invocation stack frame in accordance with the prior art;

FIGS. 5A–5D are diagrams that show Java pseudo-code examples for no escape, global escape, and arg escape in accordance with the prior art;

FIGS. 23–26 each show pseudo-code for a sample class, where the sample classes are used to illustrate the method of the preferred embodiments;

FIG. 31 is a connection graph for the GeneralClass.examine( ) method;

FIG. 32 is a connection graph for the ExampleClass.doSomeWork( ) method;

FIG. 33 is a connection graph for the ExampleClass.exampleMethod( ) method;

FIG. 34 is a stack object mapping table for call site A1 in FIGS. 26 and 33;

BEST MODE FOR CARRYING OUT THE INVENTION

Figure 1A:
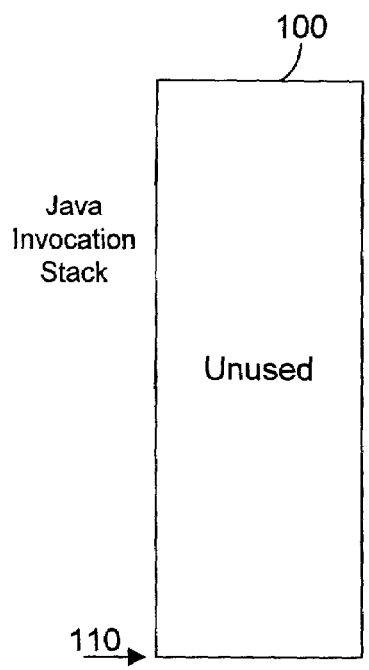
FIGS. 1A–1F are each block diagram representations of a prior art invocation stack in various states.

The present invention relates to object oriented programming techniques. For those individuals who are not generally familiar with object oriented programming, the Overview section below presents many of the concepts that will help to understand the invention.

1. OVERVIEW

Object Oriented Technology v. Procedural Technology

Object oriented programming is a method of implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process that solves the problem; whereas, the focus of object oriented design is on how the problem can be broken down into a set of autonomous entities that can work together to provide a solution. The autonomous entities of object oriented technology are, of course, objects. Said another way, object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code that provides one or more services when requested by a client. Conceptually, an object has two parts, an external object interface and internal object data. In particular, all data is encapsulated by the object interface such that other objects must communicate with that object through its object interface. The only way to retrieve, process or otherwise operate on the encapsulated data is through the methods defined on the object. This protects the internal data portion of the object from outside tampering. Additionally, because outside objects have no access to the internal implementation of an object, that internal implementation can change without affecting other aspects of the program.

In this way, the object system isolates the requester of services (client objects) from the providers of services (server objects) by a well defined encapsulating interface. Thus, in the classic object model, a client object sends request messages (e.g., method calls) to server objects to perform any necessary or desired function. The message identifies a particular server object and specifies what method is to be performed by the server object, and also supplies any required parameters. The server object receives and interprets the message, and can then determine what service to perform.

Because all operations on an object are expressed as methods called from one object to another, methods can be called by objects in other processes. Objects that reside in one process and that are capable of calling methods on an object in another process (such as a process on a remote computer system) are known as distributed objects.

Many distributed object systems allow interaction between objects in remote locations over a communications link. In a distributed object system a "client object" in one location calls methods on a "server object" in another location, which may be a remote location. The client object—server object interactions form the basis for the distributed object system.

Another central concept in object oriented programming is the class. A class is a template that defines a type of object. A class outlines the makeup of objects that belong to that class. By defining a class, objects can be created that belong to the class without having to rewrite the entire definition for each new object as it is created. This feature of object oriented programming promotes the reusability of existing definitions and promotes efficient use of program code. Each class has corresponding configuration data that determines the features or attributes of the class. Changing the configuration data for a class changes the existing class to a new class.

There are many computer languages that presently support object oriented programming techniques. For example, Smalltalk, Object Pascal, C++ and Java are all examples of programming languages that support object oriented programming to one degree or another.

Java Programming Language

Java is a modern object oriented programming language designed by Sun Microsystems that has grown in popularity in recent years. Java offers many features and advantages that makes it a desirable programming language to use. First, Java is specifically designed to create small application programs, commonly called "applets," that can reside on the network in centralized servers, and which are delivered to the client machine only when needed. Second, Java is completely platform independent. A Java program can be written once and can then run on any type of platform that contains a Java Virtual Machine (JVM). The JVM model is supported by most computer vendors, thereby allowing a software vendor to have access to hardware and software systems produced by many different companies. Finally, Java is an object oriented language, meaning that software written in Java can take advantage of the benefits of object oriented programming techniques.

As in other object oriented systems, operations in Java are performed by one object calling a method on another object. These objects can reside locally on the same machine or on separate JVM's physically located on separate computers or systems.

Invocation Stacks in Java

Figure 1B:
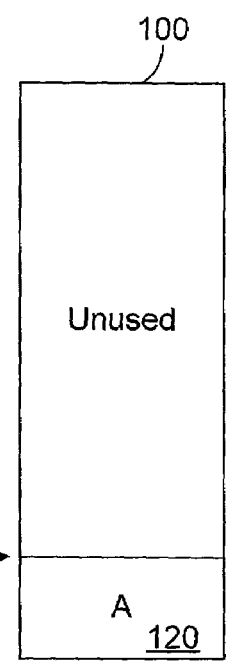

The Java programming language defines one or more invocation stacks that are used to store information when a method is called (or invoked). FIG. 1 shows various views of an invocation stack 100 in different states. Referring to FIG. 1A, invocation stack 100 is shown before any methods are invoked, with its stack pointer 110 at the bottom of the stack. Entries are stored on the stack bottom up. Note that the stack pointer could equally be at the top of the stack, with the entries stored on the stack top down. FIG. 1B illustrates what happens when method A is invoked. An invocation stack frame 120 for A is pushed on the stack, and the stack pointer 110 is then moved to the next available location on the stack.

An invocation stack frame can contain many different types of data. For example, an invocation stack frame can contain the stored state of all processor registers when the method was invoked, so that some or all of these values can be restored when the method has completed. An invocation stack frame can also contain storage for any variables that are local to the method. Thus, if an integer m is declared as a local variable, the invocation stack frame would contain the memory allocation for m. The prior art recognized that object invocations whose lifetimes do not escape the invoking method may also be stored on the stack frame as well.

Figure 1C:
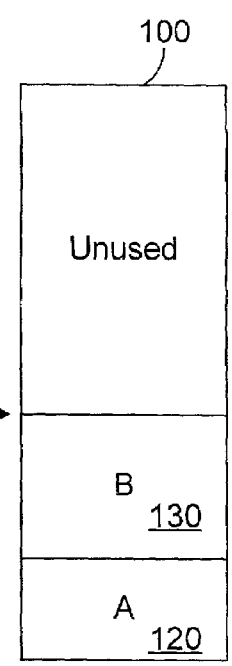
Figure 1D:
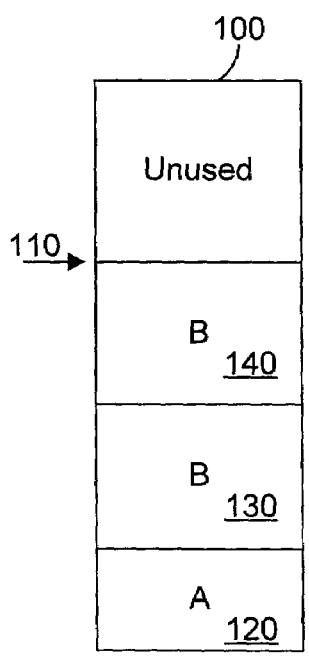
Figure 1E:
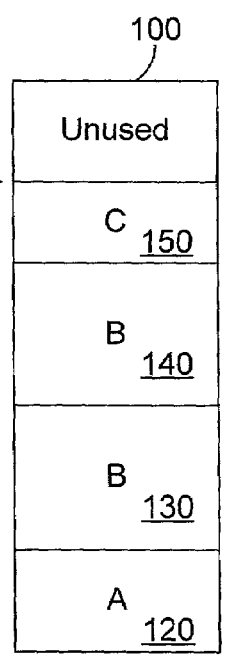
Figure 1F:
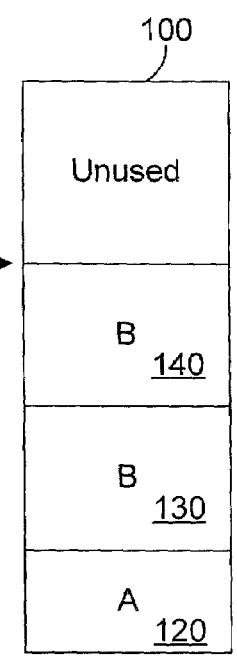

Referring to FIG. 1C, we assume that in the execution of method A, method B is invoked, so the stack frame 130 for method B is pushed on the invocation stack 100, and the stack pointer 110 is moved to the next available location. We assume that method B calls itself, which causes another instance 140 of a stack frame for method B to be stored on the invocation stack 100, with the stack pointer 110 moved to the next available location, as shown in FIG. 1D. We assume that the second invocation of method B then calls method C, so the stack frame 150 for method C is then pushed onto the invocation stack and stack pointer 110 is moved to the next available location. At this point we assume that method C does not call any other methods, and runs to completion. This causes the stack pointer 110 to move down to the beginning of the stack frame for method C, effectively reclaiming the area of the invocation stack 100 that was used for stack frame 150. The example illustrated in FIGS. 1A–1F (and especially in FIG. 1F) makes it clear that allocating an object on a stack frame does not create any additional overhead. It may require that stack pointer 110 move a little farther to make room for the object, but this does not create any run-time performance penalty. Because of this, the more objects we can allocate to the invocation stack, the better the performance of the resulting code will generally be.

A difference between C++ and Java is illustrated in FIGS. 2 and 3. Referring to FIG. 2A, we assume that a "Square" is a name of a particular type of object. A programmer in C++ can declare a variable as being of a "type" that is an object. As shown in FIG. 2A, the statement "Square k" is a declaration of a variable "k" that is of the type "Square", which is an object. When a variable is defined as an object, as in FIG. 2A, the object can be allocated directly on the invocation stack frame for the method, as shown in FIG. 2B. The Square object 230 that corresponds to k is stored on the invocation stack frame 220 for A.

In Java, variables do not denote objects, but instead denote references (i.e., apointers) to objects. Referring to FIG. 3A, the declaration Square k=new Square( ) is a statement that says that variable k is a reference to a new object of type Square. Only the reference 330 (representing k) is stored in the stack frame 220 for the method, as shown in FIG. 3B; the Square object 340 pointed to by reference 330 is allocated from the heap 350, as shown in FIG. 3C.

Prior Art Escape Analysis

The "escape analysis" performed by Choi et al. in "Escape Analysis for Java", in Proceedings of the Conference on Object Oriented Programming, Systems, and Languages (OOPSLA), Denver, Colo. (November 1999), p. 1–19, determines whether the lifetime of an object "escapes" the method that creates the object. If not, the object itself 440 can be allocated on the stack, as shown in FIG. 4. Even though k is still a reference 330, the object 440 to which it points can also be stored on the invocation stack frame 220 for the method that creates the object 440. As described above with reference to FIG. 1, allocating objects to a method's invocation stack frame significantly enhances performance of the computer program.

Examples of Java pseudo-code are presented in FIGS. 5A–5D to illustrate examples of allocation instructions that are "no escape" (FIG. 5A), "global escape" (FIG. 5B), and "arg escape" (FIGS. 5C and 5D). In FIG. 5A, a variable k is defined as a reference to a new object of type Square, but we assume that the lifetime of the allocated object referenced by k does not escape method A. The prior art Choi approach allocates all objects (with some restrictions) for no escape allocations on the method's invocation stack frame. FIG. 5B shows the same variable declaration in FIG. 5A, but later in method A( ) there is another declaration of a variable classVar that is a reference to the object referenced by k. We assume that classVar is a class variable declaration, which means that its lifetime extends globally beyond method A( ), making this allocation a global escape case. The prior art Choi approach allocates all objects that are global escape to the heap.

FIG. 5C has the same declaration statement for k as FIG. 5A, but includes a statement that returns a reference to the allocated object referenced by k from method A( ). This return value means that the lifetime of the allocated object may potentially extend beyond method A( ), but we don't know to what extent. FIG. 5D shows a different case for arg escape. An instruction L.addToList(k) adds the reference k to a list. The allocated object referenced by k can thus potentially be accessed outside of method A( ), but is not necessarily accessed. These cases illustrate the "arg escape" case, where an argument or return value causes the lifetime of an object to potentially extend beyond the scope of the method that creates the object. The prior art Choi approach treats arg escape cases the same as global escape, forcing these allocations to the heap.

Figure 6:
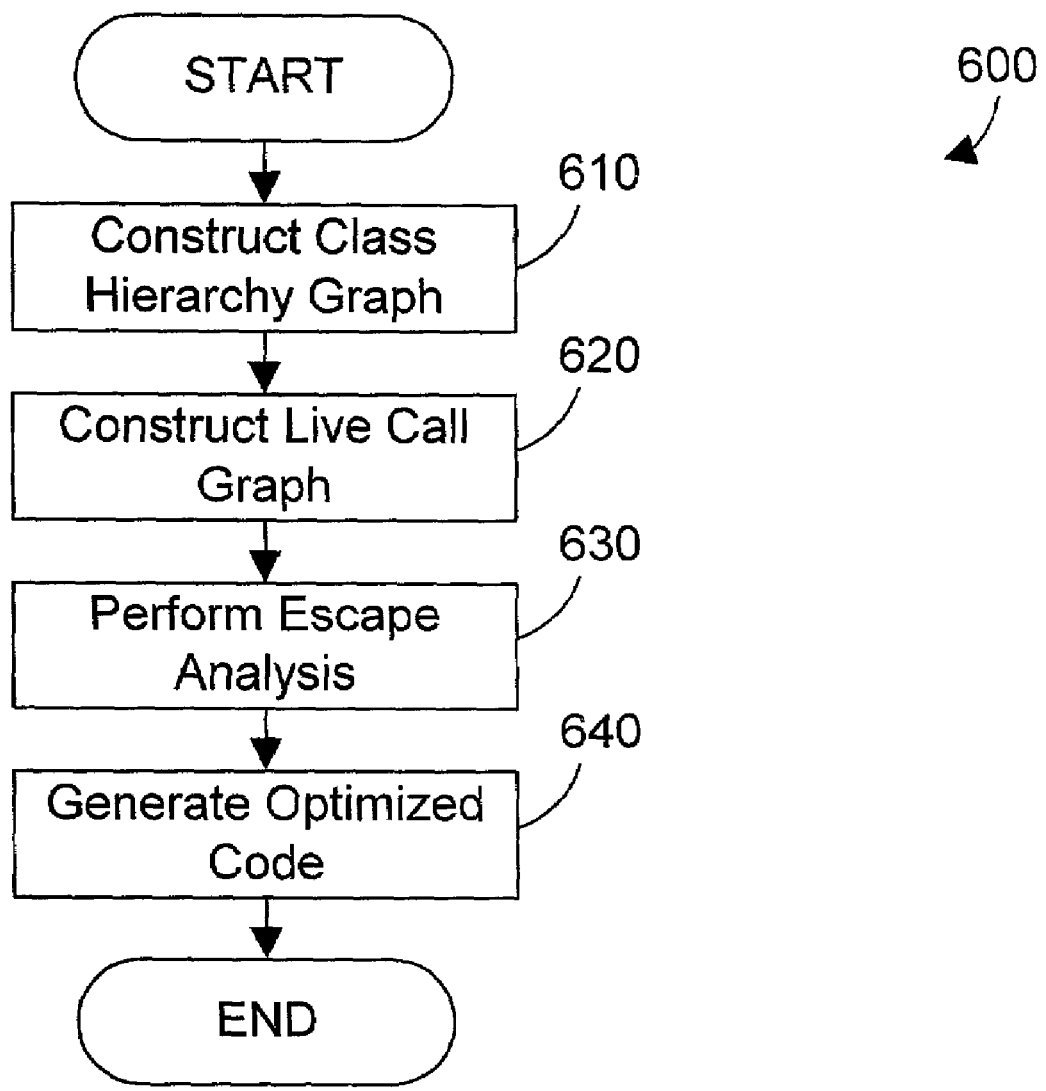
FIG. 6 is a prior art method for allocating objects in a Java program.

The prior art method disclosed in Choi et al. is represented in simplified form in the method 600 of FIG. 6. First, a class hierarchy graph is constructed (step 610). The class hierarchy graph represents inheritance relationships among all classes in a Java program. There is a node in the class hierarchy graph for each class in the program, and there is an arc in the class hierarchy graph from the node for class B to the node for class A if and only if B directly inherits from (i.e., "extends") class A.

Once a class hierarchy graph is constructed in step 610, a live call graph is constructed (step 620). The live call graph contains one node for every method in a Java program that can apparently be called during that program's execution. Methods that can be called from outside the Java program (such as "main") are designated as "root methods." The node for a method A contains an arc to a subnode for each call site contained in A. There is an arc from the subnode for a call site S to the node for method B if it appears possible for method B to be called at call site S. By definition, every method in a live call graph can be reached from at least one root node by a directed sequence of arcs; methods that cannot be executed ("dead methods") are not represented in the live call graph. A method that calls no other method is designated as a "leaf method." The class hierarchy graph is consulted at virtual method call sites to determine which methods may potentially be called, based on inheritance. Construction of class hierarchy graphs and live call graphs are well known in the art.

Once a live call graph has been built in step 620, an escape analysis can be performed (step 630). An escape analysis means that each allocation instruction (that creates an object) is labeled as one of the three options: no escape, global escape, and arg escape. Once the escape analysis in step 630 is complete, the code is then generated (step 640) using the information in the escape analysis to determine where each object is allocated. In the prior art Choi et al. approach of method 600, objects that are no escape are allocated on the invocation stack frame of the method that creates the object, while objects that are global escape and arg escape are allocated from the heap.

Figure 7:
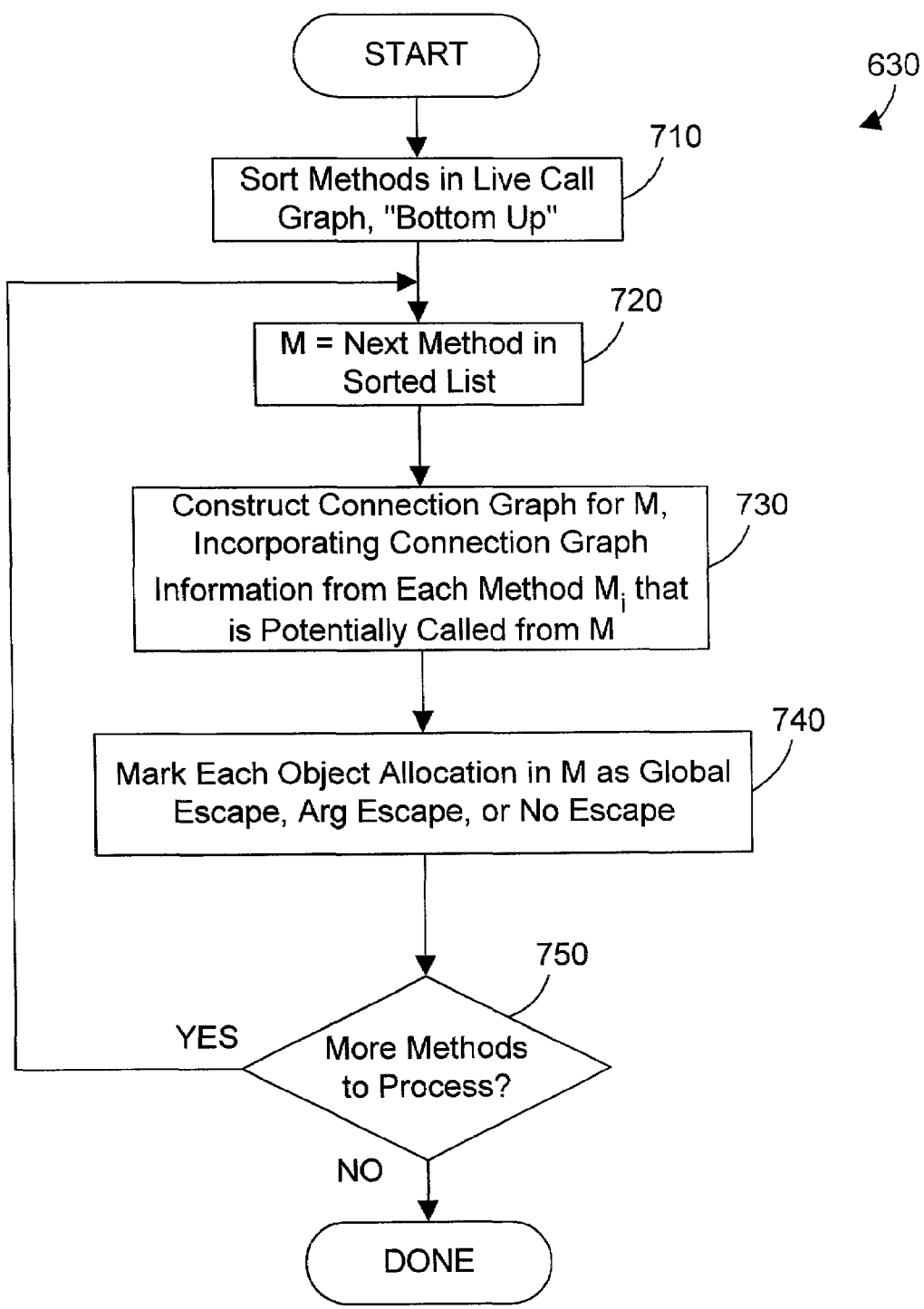
FIG. 7 is a prior art method for performing escape analysis for object allocations in a Java program during static compilation of the Java program.

Details of the escape analysis step 630 of FIG. 6 are shown in the flow diagram of FIG. 7. First, the methods in the live call graph are sorted from the bottom up (step 710). This means that leaf nodes in the graph are considered first, which do not call other methods. The first method on the sorted list is then assigned to M (step 720). A connection graph is then constructed for M, incorporating connection graph information for each method (denoted $M_i$) that is potentially called from M (step 730). A connection graph denotes potential relationships among variables and parameters that may reference objects, statements that allocate objects, and fields contained in objects. Next, each object allocation in M is marked as global escape, arg escape, or no escape (step 740). If more methods need to be processed (step 750=YES), control is passed to step 720 and processing continues. Once all methods have been processed (step 750=NO), step 630 is done. Note that the description of a connection graph herein is simplified for the purpose of illustrating the preferred embodiments of the invention. For more details regarding how to construct a connection graph, see the Choi et al. article referenced above.

Figure 8:
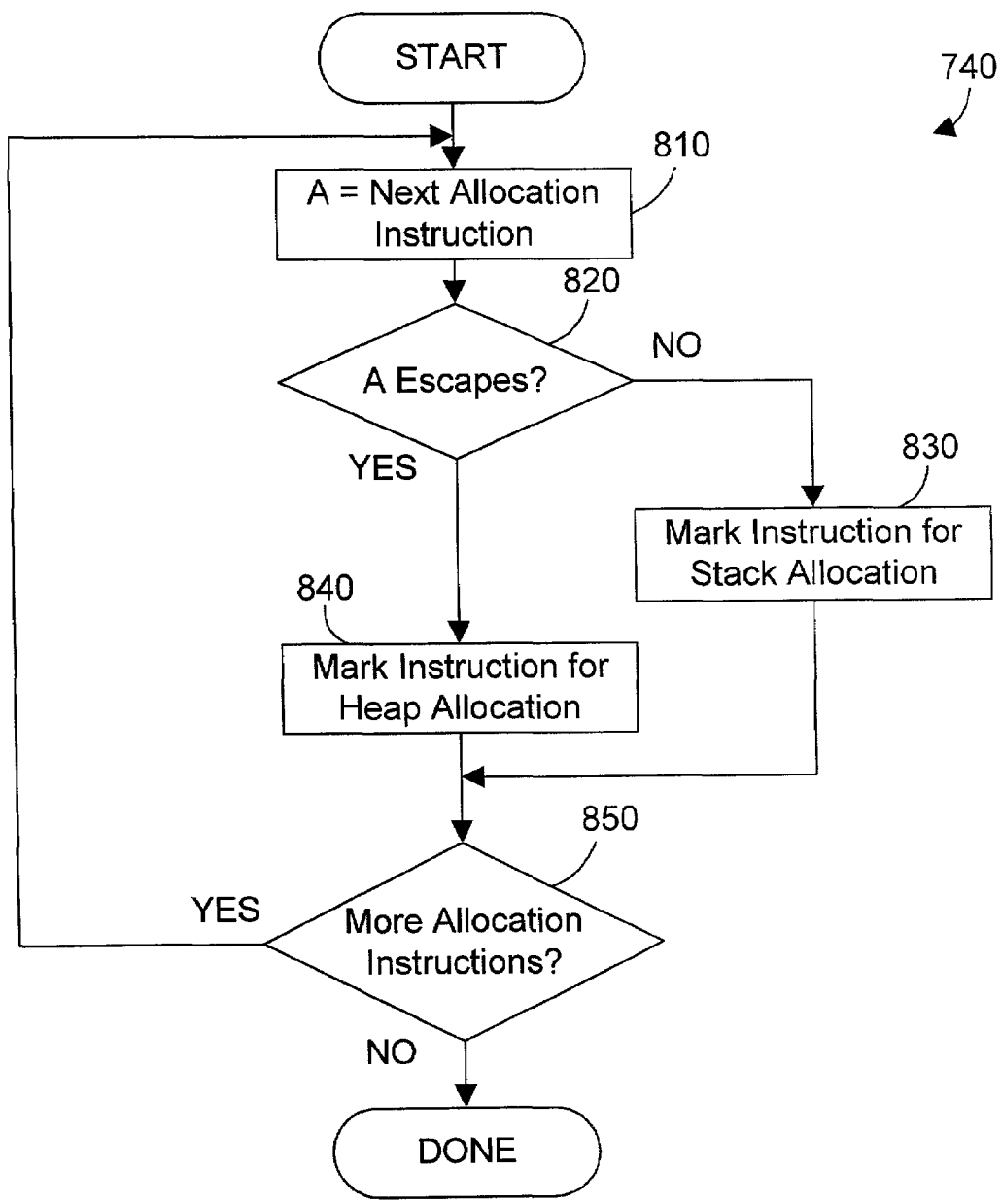
FIG. 8 is a prior art method for performing step 740 of FIG. 7.

Referring to FIG. 8, one specific implementation of step 740 in FIG. 7 is shown. An allocation instruction is selected, which corresponds to a label A (step 810). If the object allocated by A has a lifetime that escapes the method that created it (step 820=YES), the instruction that allocated the object is marked for heap allocation (step 840). If the object allocated by A has a lifetime that does not escape the method that created it (step 820=NO), the instruction that allocated the object is marked for stack allocation (step 830). If there are more allocation instructions to analyze (step 850=YES), control is passed to step 810 and processing continues until there are no more allocation instructions to analyze (step 850=NO).

In the prior art, once an escape analysis has been performed, such as that shown by step 630 in FIGS. 6 and 7 and step 740 in FIG. 8, the code can then be optimized using this escape analysis information. If an allocation instruction in the object oriented program is marked as no escape, code is generated for the allocation instruction that causes an object to be allocated on the stack. This allocation is preferably on the invocation stack frame of the method. If the instruction is marked either global escape or arg escape, code is generated for the allocation instruction that causes an object to be allocated from the heap. In this manner the prior art can allocate allocation instructions that are marked no escape to the stack.

It is very important to note at this point that the prior art escape analysis as described above with respect to FIGS. 6–8 has only been used in a static compilation environment. The decision of whether the lifetime of an object "escapes" the method that created the object requires knowledge of all of the definitions and uses of the object. With a Java program that is statically compiled, all of the definitions and uses of the object can generally be determined. However, in a dynamic compilation environment, classes are dynamically loaded as the program is run. Thus, all of the definitions and uses of an object are not known until all of the classes are loaded. In fact, for many dynamically executed Java programs, all of the classes will almost never be loaded in a dynamic compilation environment, because the loading of classes is determined by execution paths through the program. For these reasons, the prior art escape analysis has never been applied to a dynamic compilation environment.

Prior Art Dynamic Compilation

Java is a language that can run in either an interpreted mode or a compiled mode. Executing Java statements in interpreted mode is much slower than executing compiled Java code. Java static compilers are used to compile an entire Java program before it is loaded and executed. Java dynamic compilers are compilers that are used to compile at run-time portions of code that are executed often enough that the cost of compiling the code will be outweighed by the performance benefit of executing compiled code instead of executing interpreted code. In a dynamic compilation environment, the Java program is typically loaded and executed in interpreted mode until sufficient information is gathered to know which portions of code are executed frequently. These frequently-executed code portions can then be dynamically compiled (as the program executes), and once compiled will improve the run-time performance of the Java program.

Figure 9:
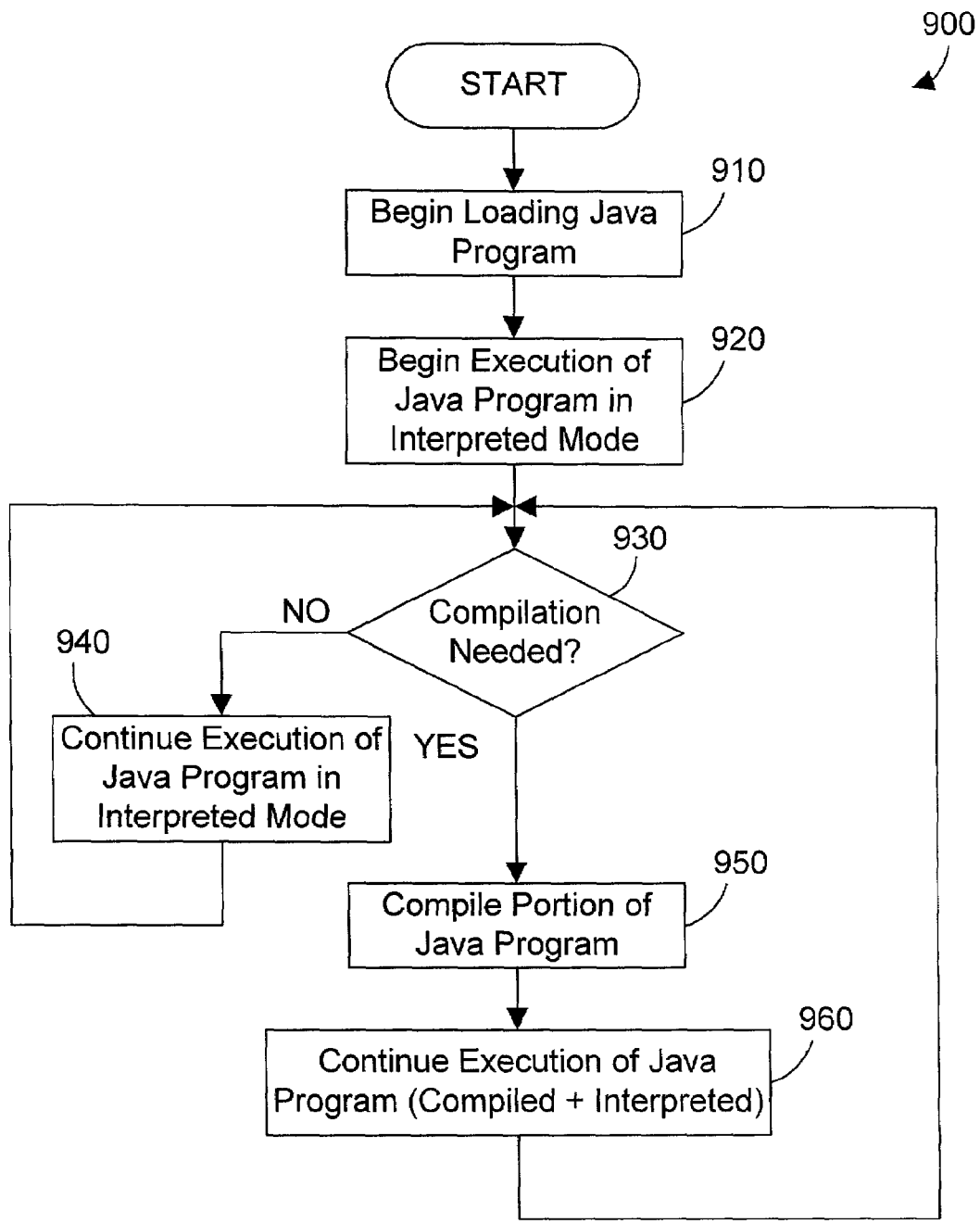
FIG. 9 is a prior art method for loading and dynamically compiling portions of a Java program.

Referring now to FIG. 9, a prior art method 900 for running a Java program and dynamically compiling one or more portions of the program begins by loading the first part of the Java program (step 910). Once enough classes are loaded that execution can begin, the execution of the program begins in interpreted mode (step 920). If compilation of a part of the Java program is not required (step 930=NO), the Java program continues to be executed in interpreted mode (step 940). If it is determined that dynamic compilation of a portion of the Java program is needed (step 930=YES), the portion of the Java program is dynamically compiled (step 950). Execution then continues, with some of the Java program executing in interpreted mode while the compiled portions run in compiled mode (which is much faster than interpreted mode) (step 960).

In the prior art, one suitable way to determine whether compilation is needed (step 930) is to count the number of times a method is invoked. The first few times a method of a particular class is invoked, it is typically run in interpreted mode. When the count exceeds some predetermined threshold value, method 900 determines that compilation is needed (step 930=YES). In this manner, the portions of code that are seldom executed will be run in interpreted mode, while the portions of code that are frequently executed (i.e., the "hot spots" in the code) will be compiled to improve the run-time performance of the Java program.

As stated above, the compilation of a portion of a Java program (step 950) in the prior art has never allocated objects on a stack because the lifetimes of the objects cannot be determined before all of the classes have been loaded. The prior art is thus limited to allocation of objects to the heap in a dynamic compilation environment. The preferred embodiments of the present invention, as described in detail below, allow allocating some objects on a stack in a dynamic compilation environment, even though the lifetime information of an object is incomplete because not all of the classes have been loaded.

2. DETAILED DESCRIPTION

An apparatus and method in accordance with the preferred embodiments perform an escape analysis, similar to the Choi et al. escape analysis known in the prior art, on objects that are allocated in a dynamic compilation environment. The apparatus and method of the present invention assumes that the information present in the classes that have been loaded so far is complete, and performs escape analysis to determine whether to allocate an object on an invocation stack or on the heap based on the available information. As each subsequent class is loaded, it is analyzed to see if loading the class might change the analysis used to allocate objects on the invocation stacks of previously-compiled methods. If it does, the apparatus and method of the present invention analyze the newly-loaded class and determine whether the object can still be allocated on the stack, or whether it must be changed to be allocated on the heap. If the object allocation must be changed to the heap, appropriate changes are made to pointers in the compiled methods and to pointers in existing stack frames to point to a new object on the heap instead of the old object on the stack.

Figure 10:
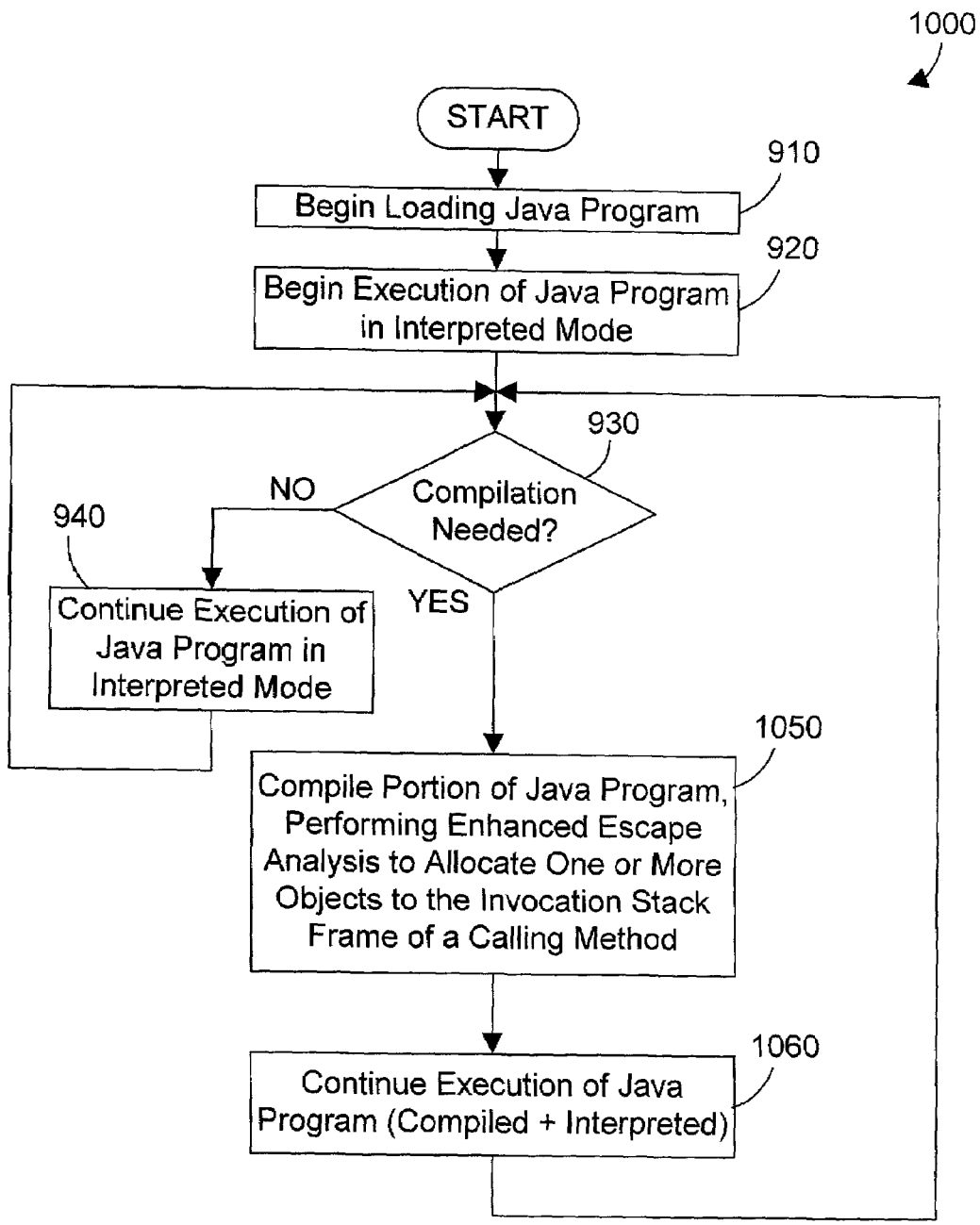
FIG. 10 is a flow diagram of a method in accordance with the preferred embodiments for performing escape analysis to determine whether to allocate an object to an invocation stack frame of a method or to allocate the object to the heap when dynamically compiling a Java program.

Referring to FIG. 10, a method 1000 in accordance with the preferred embodiments can allocate objects in a dynamic compilation environment to an invocation stack for a method that creates the object. First, portions of the Java program are loaded (step 910). Once sufficient code has been loaded, the execution of the Java program begins in interpreted mode (step 920). If no compilation is needed (step 930=NO), the execution of the Java program continues in interpreted mode (step 940). If compilation is needed (step 930=YES), a portion of the Java program is compiled, with one or more objects being allocated to the invocation stack frame of a method that creates the object (step 1050). The execution of the Java program then continues in a mixed compiled/interpreted mode (step 1060). Note that steps 910, 920, 930, and 940 are suitably the same as the steps of the same number in the prior art flow in FIG. 9. Steps 1050 and 1060 perform functions not present in the prior art, and are therefore the focus of the disclosure herein.

Figure 11:
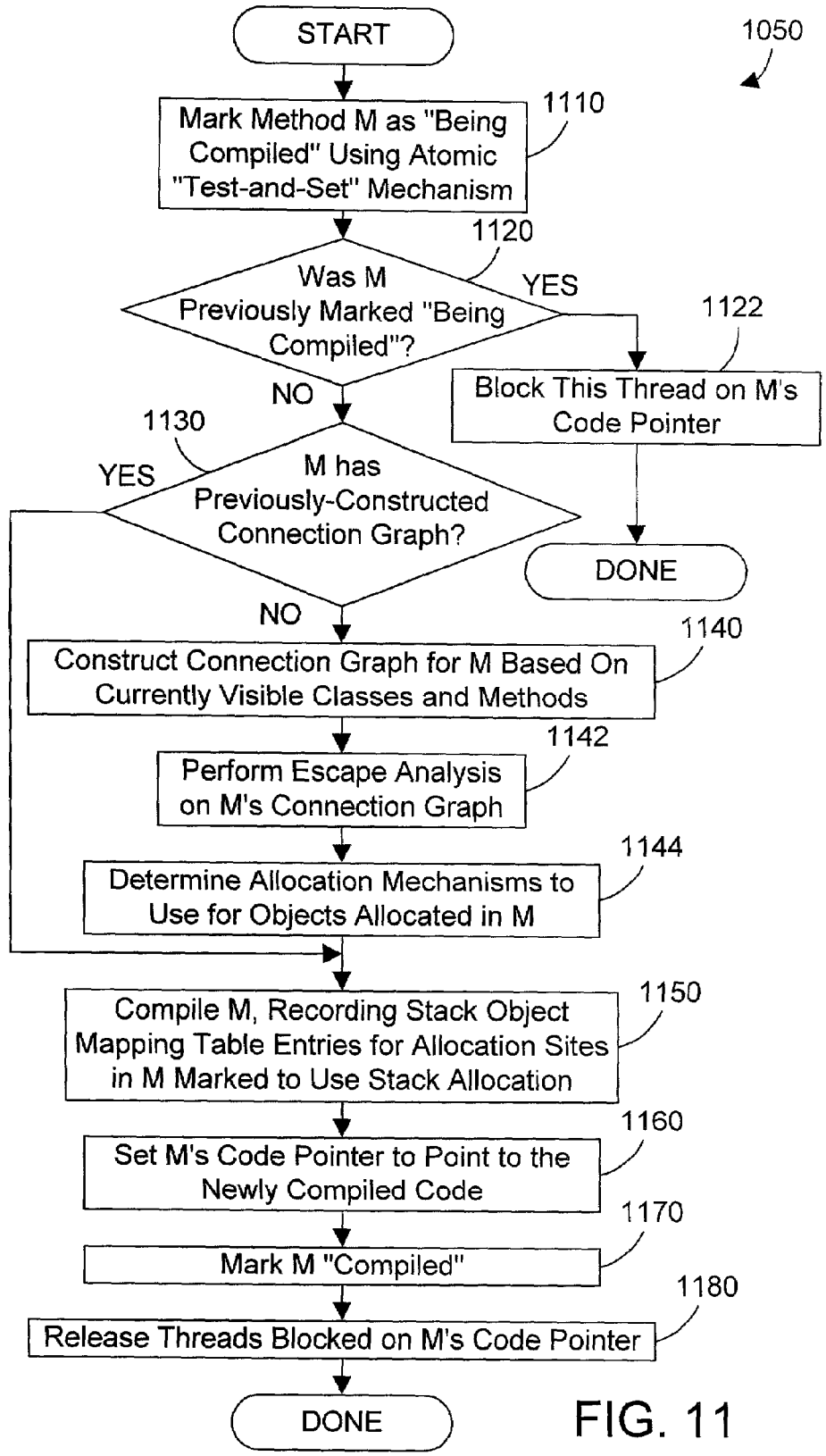
FIG. 11 is a flow diagram of one suitable method in accordance with the preferred embodiments for performing step 1050 of FIG. 10.

Conceptually, step 1050 allocates one or more objects to an invocation stack, and step 1060 must then monitor subsequently-loaded classes to see if they interfere with the object that was previously-allocated on the invocation stack. FIG. 11 shows steps in one suitable method for implementing step 1050 of FIG. 10. The steps in FIG. 11 will be performed once for each method M that is to be compiled. The methods of the preferred embodiments presented herein assume a multithreaded environment of a Java virtual machine. As a result, there are necessarily a number of mechanisms required to handle contention for shared resources. Two common mechanisms are assumed to be available. The simplest is a lock-release mechanism for a resource. A thread that wants to use a lockable resource must first obtain a lock on the resource. The underlying operating system code ensures that only one thread may have a lock on the resource at a time. If the lock is already held by another thread, the requesting thread is placed in a wait state until the lock is available. When the resource is no longer needed, the thread that locked it must issue a release request, allowing the next waiting thread to obtain the lock.

The second concurrency mechanism is a test-and-set mechanism. This is an operation that appears atomic to all threads; that is, once a thread begins a test-and-set, it cannot be interrupted until that operation has completed. A test-and-set on a given memory location sets that location to a given value, and returns the previous value that was stored in that location. This allows a cooperating set of threads to interact so that, if multiple threads attempt to set the location to a value, each will know whether it was the thread which first successfully changed the value. Typically that thread will then perform an operation requiring exclusive access, while the other threads either wait for the operation to complete, or simply go about other business.

The test-and-set mechanism is used to indicate the state of methods as being in one of three states: never compiled; being compiled; and compiled. Contention can occur when multiple threads decide to compile or recompile a method (moving it from either the "never compiled" state or the "compiled" state to the "being compiled" state). A test-and-set mechanism is used to control the move to the "being compiled" state. This is the case in step 1110 of FIG. 11, where a method M is marked as "being compiled" using an atomic test-and-set mechanism. If M was previously marked "being compiled" (step 1120=YES), this means that the current thread must wait until M is "compiled", so this thread is blocked on M's code pointer (step 1122). Each method has an associated code pointer that describes in some manner how the method is to be executed. The code pointer preferably points initially to the JVM's interpreter, indicating that the byte codes should be interpreted. Initial compilation of a method in this type of system is triggered by some condition, generally involving the number of times that method has executed in interpreted mode. After compilation, the code pointer contains a pointer to the compiled code. Calls to the method will then be indirect jumps through the code pointer to the compiled code. When recompilation is to take place in the preferred embodiments, the code pointer is invalidated so that such an indirect jump will cause an exception to be triggered, typically by setting the code pointer to zero. An exception handler in the JVM catches occurrences of such an exception condition and forces the excepting thread to wait until the code pointer is once again valid.

If M is not marked as "being compiled" (step 1120=NO), M is checked to see if it has a previously-constructed connection graph (step 1130). If so (step 1130=YES), control is passed to step 1150. If not (step 1130=NO), a connection graph is constructed for M, based on all currently visible classes and methods (step 1140). An escape analysis is then performed on M's connection graph (step 1142). The results of the escape analysis determine the allocation mechanisms to use for objects allocated in M (step 1144). Method M is then compiled, with all allocations to M's invocation stack being recorded in a stack object mapping table (step 1150). Each entry contains two pieces of information: the size of the object allocated at this site, and the offset in the stack frame where the object is located. M's code pointer is then set to point to the newly-compiled code (step 1160). M is then marked "compiled" (step 1170), and any threads blocked on M's code pointer are released (step 1180).

Figure 12:
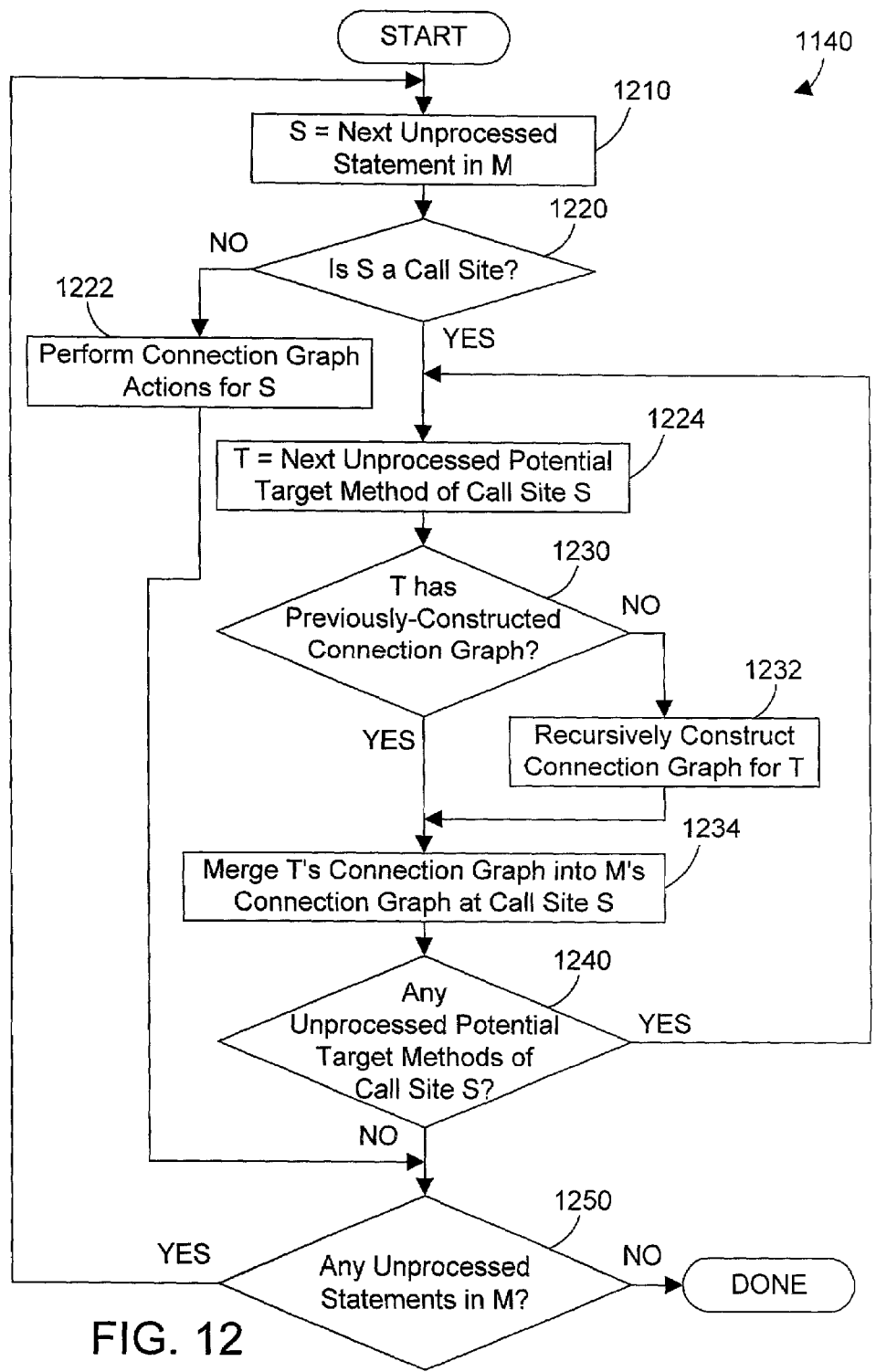
FIG. 12 is a flow diagram of one suitable method in accordance with the preferred embodiments for performing step 1140 of FIG. 11.

The step of constructing a connection graph for method M in step 1140 of FIG. 11 may be carried out by a series of suitable steps as shown in FIG. 12. First, the next unprocessed statement in M is denoted S (step 1210). If S is not a call site (step 1220=NO), connection graph actions are performed for S (step 1222), as taught by Choi et al. If S is a call site (step 1220=YES), the next unprocessed potential target method of call site S is denoted T (step 1224). If T does not have a previously-constructed connection graph (step 1230=NO), the connection graph is recursively constructed for T (step 1232) using the method of FIG. 12. Once we have a connection graph for T, T's connection graph is merged into M's connection graph at call site S (step 1234). This merging of connection graphs is taught in Choi et al. If there are any unprocessed potential target methods of call site S (step 1240=YES), control is passed to step 1224 for further processing. If there are no more unprocessed potential target methods of call site S (step 1240=NO), we check to see if there any more unprocessed statements in M (step 1250). If so (step 1250=YES), control is passed to step 1210, and processing continues. If not (step 1250=NO), step 1140 is done.

Figure 13:
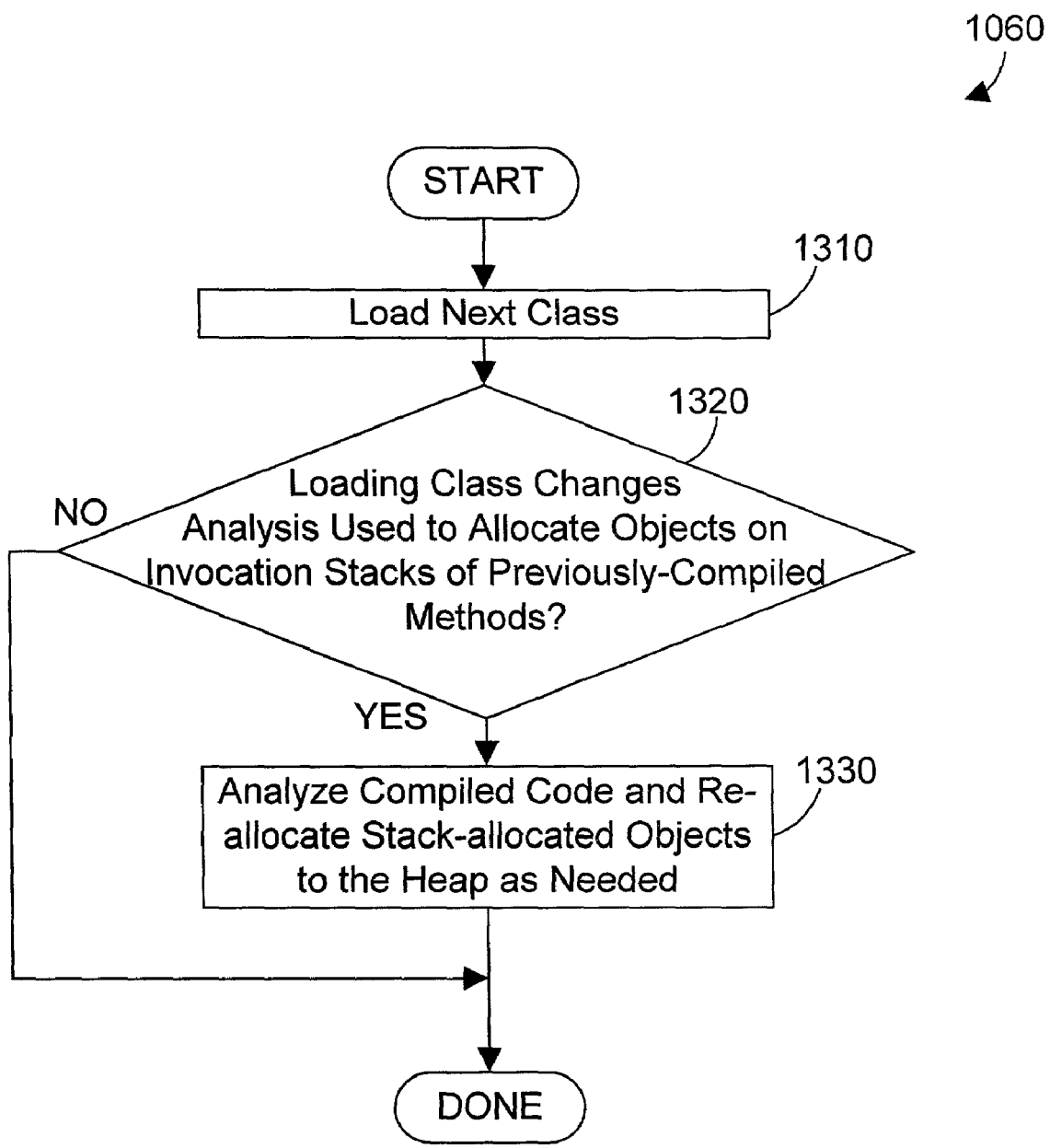
FIG. 13 is a flow diagram of one suitable method in accordance with the preferred embodiments for performing step 1060 of FIG. 10.

One suitable detailed implementation of step 1050 of FIG. 10 is discussed above with reference to FIG. 11. FIG. 13 shows one suitable implementation of part of step 1060 of FIG. 10 that is invoked each time a new class is to be loaded, based on the semantics of the Java programming language. FIG. 13 begins by loading the next class (step 1310). The loaded class is analyzed to see if loading the class might change the analysis used to allocate objects on the invocation stacks of previously compiled methods (step 1320). If not (step 1320=NO), the loading of the class does not affect the previously-allocated object on the stack frame, and step 1060 is done. If, however, the newly-loaded class has one or more call sites that references one or more methods that create one or more objects that are allocated to a stack frame (step 1320=YES), the compiled code must be analyzed, and one or more stack-allocated objects may have to be changed to be allocated to the heap instead (step 1330). In essence, step 1060 in FIG. 13 shows that analysis of newly loaded classes is necessary to see if the assumptions previously made to allocate an object on an invocation stack still hold true. If so, the object allocation remains on the stack. If not, the object allocation is changed to the heap.

Figure 14:
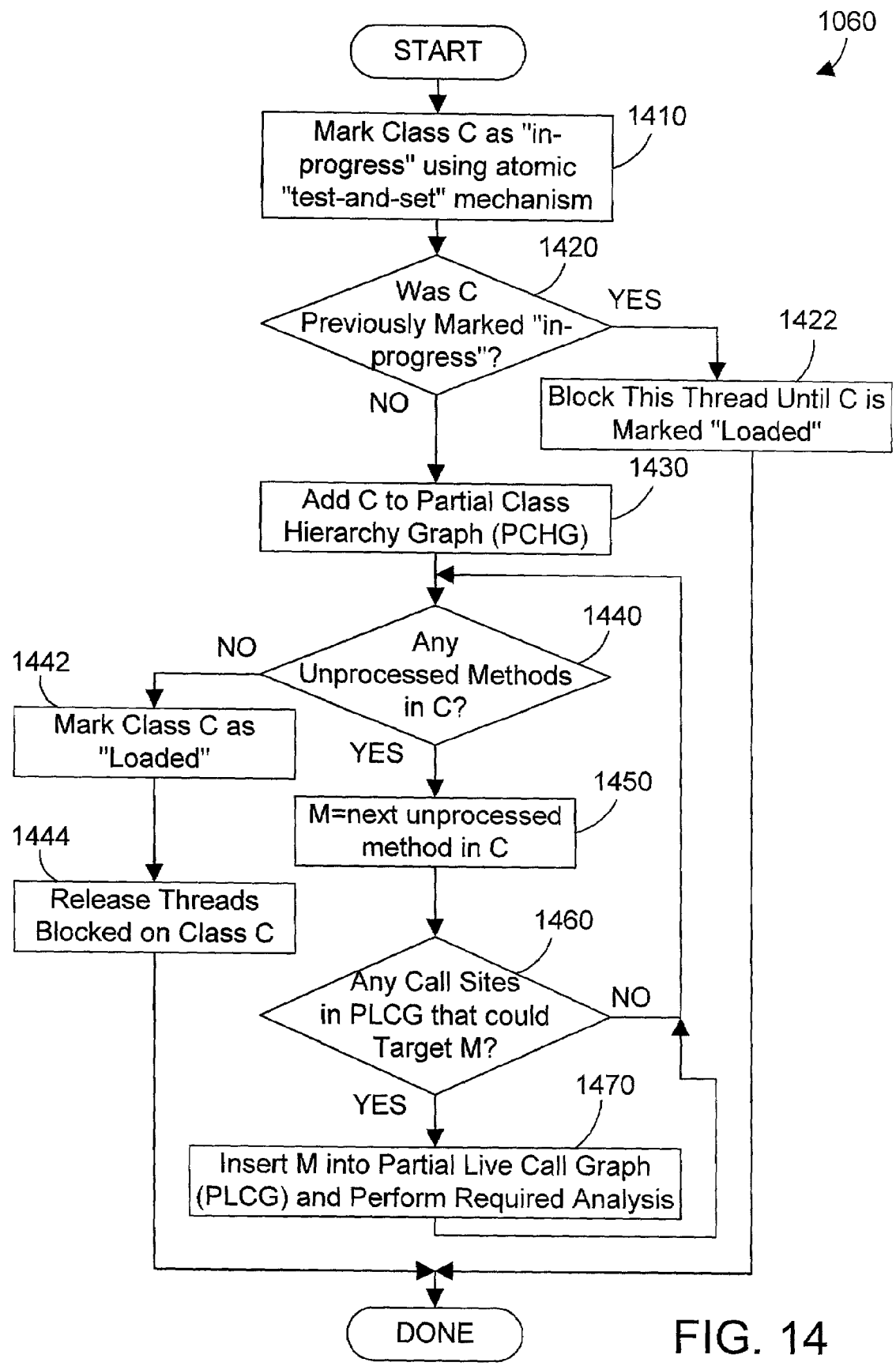
FIG. 14 is a flow diagram of another suitable method in accordance with the preferred embodiments for performing step 1060 of FIG. 10.

A more detailed implementation of a portion of step 1060 of FIG. 10 that is invoked each time a new class is to be loaded is shown in FIG. 14. Another type of memory location that is used by the test-and-set mechanism indicates that a class can be in one of three states: not loaded; in progress; and loaded. Since it would be bad for multiple threads to attempt to load the same class simultaneously, a test-and-set mechanism is used to change the value from "not loaded" to "in progress". The thread that successfully changes the value then finishes the job of loading the class, and finally changes the state from "in progress" to "loaded". Thus, the first step is to mark class C as "in progress" using an atomic test-and-set mechanism (step 1410). If C was previously-marked "in progress" (step 1420=YES), this thread is blocked until C is marked "loaded" (step 1422). In this manner, one thread is given responsibility for loading a class. If C was not previously marked "in progress" (step 1420=NO), C is added to the partial class hierarchy graph (PCHG) (step 1430). If there are no unprocessed methods in C (step 1440=NO), class C is marked as "loaded" (step 1442), and the threads blocked on class C are released (step 1444). If there are unprocessed methods in C (step 1440=YES), the next unprocessed method in C is denoted M (step 1450), and the partial live call graph (PLCG) is analyzed to determine whether there are any call sites that could target M (step 1460). If not (step 1460=NO), this method M does not affect the objects that were previously allocated to M's invocation stack, so the next unprocessed method is considered by returning to step 1440. If there is one or more call site in the partial live call graph that could target M (step 1460=YES), method M is inserted into the partial live call graph and the required analysis is performed to determine the effect of the insertion (step 1470). Control is then passed to step 1440 to determine if there are any more unprocessed methods in C. As soon as all methods have been processed (step 1440=NO), class C is marked as loaded (step 1442), the threads blocked on class C are released (step 1444), and step 1060 is done.

Figure 15A:
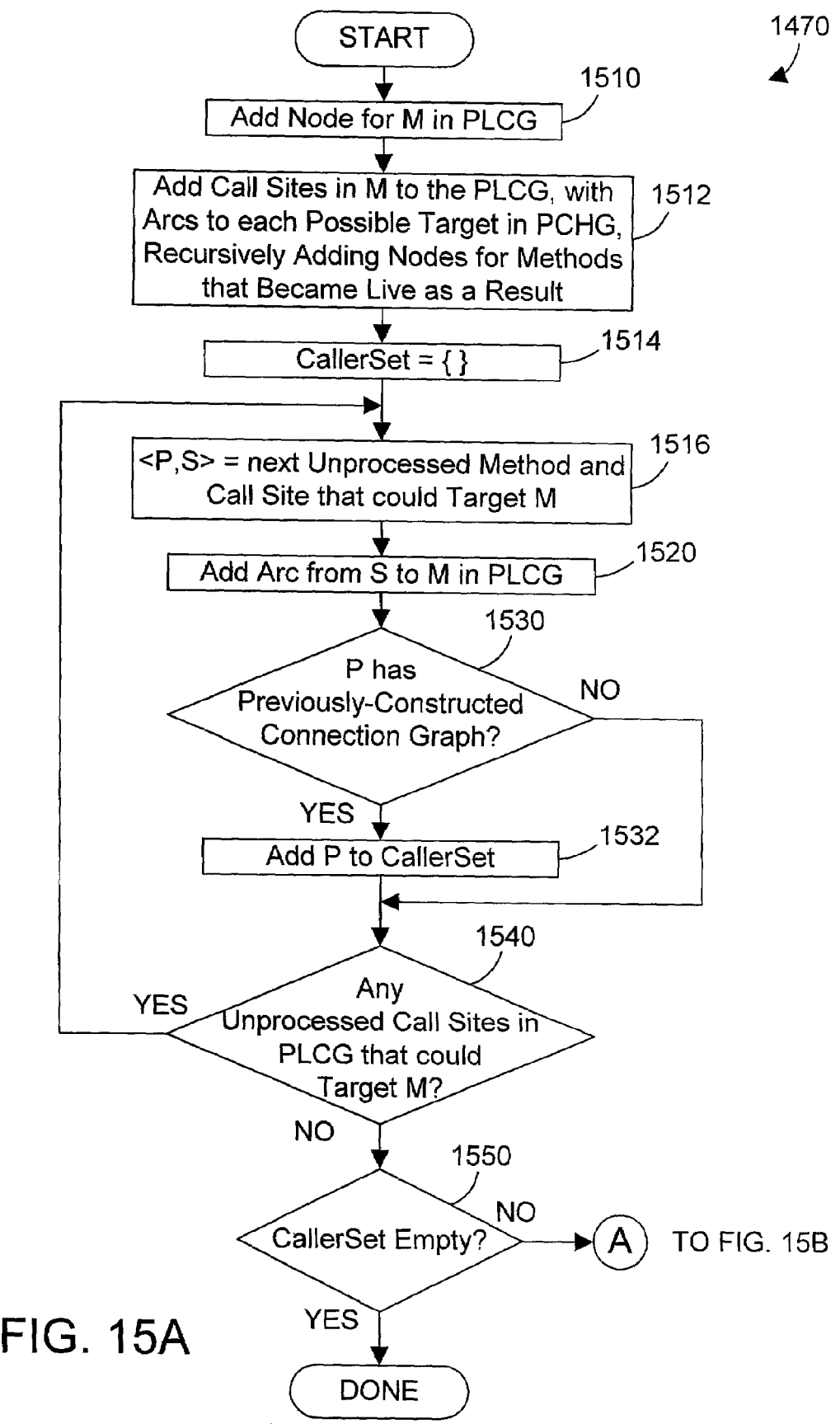
FIGS. 15A and 15B are parts of a flow diagram of one suitable method in accordance with the preferred embodiments for performing step 1470 of FIG. 14.
Figure 15B:
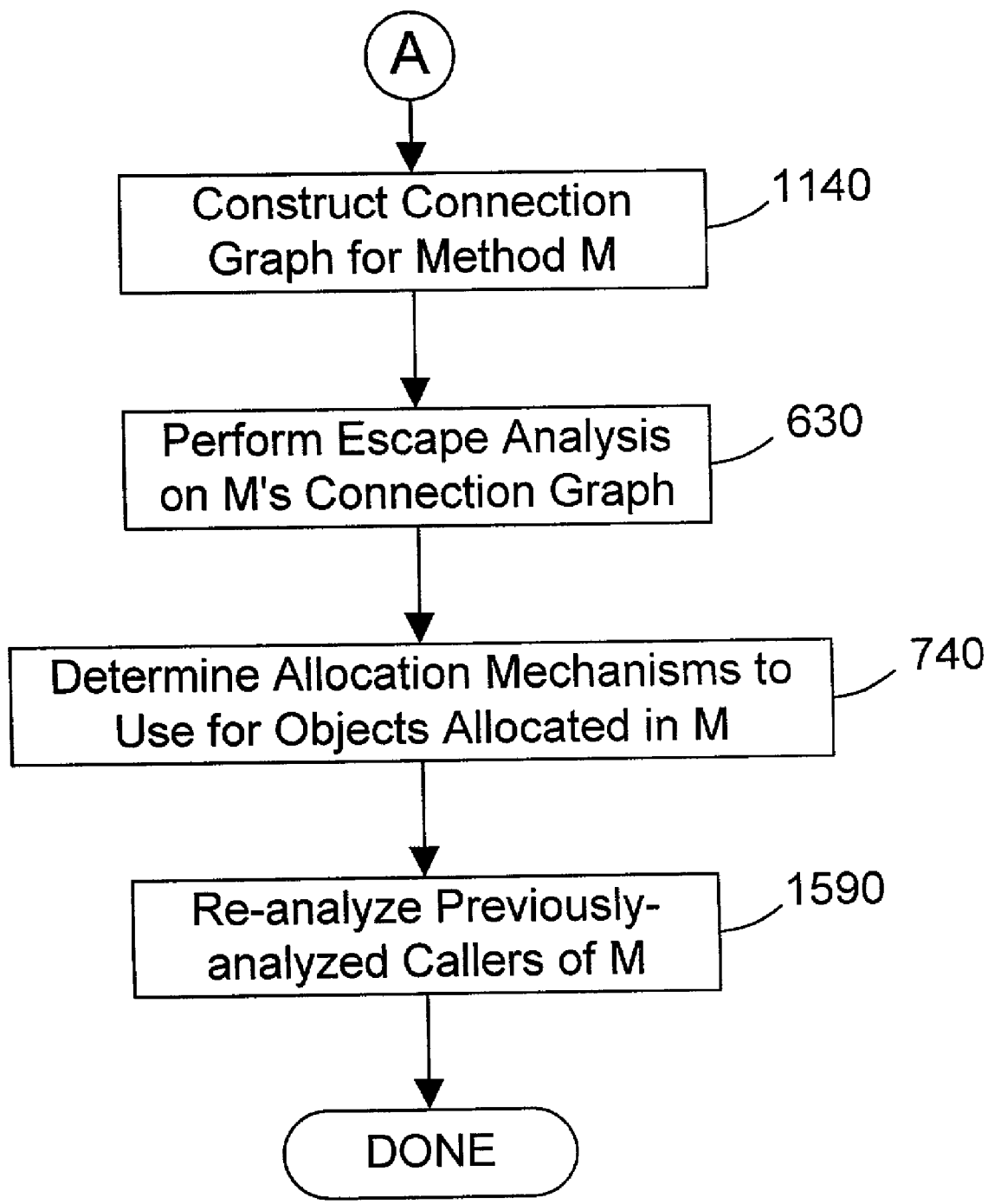

One suitable implementation of step 1470 in FIG. 14 is shown in FIGS. 15A and 15B, which illustrate what happens when method M is inserted in the partial live call graph. First, a node for method M is added in the partial live call graph (step 1510). Call sites in M are then added to the partial live call graph, with arcs to each possible target in the partial class hierarchy graph, recursively adding nodes for methods that become live as a result (step 1512). Step 1512 creates subnodes for each call site in M, and searches the partial class hierarchy graph to find all loaded methods that could be targets of those call sites. Arcs are added to those methods in the partial live call graph, and if any of them become live for the first time, this process is repeated to find call sites in those methods. A set variable denoted "CallerSet" is then created and initialized to be empty (step 1514). The purpose of CallerSet is to build up a set of methods that have previously been analyzed and that contain call sites that may target method M. First, a tuple consisting of the next unprocessed method P and a call site S that could target M is determined (step 1516). An arc is then added from call site S to method M in the partial live call graph (step 1520). If P has a previously-constructed connection graph (step 1530=YES), P is added to the CallerSet (step 1532). Otherwise (step 1530=NO), P is not added to the CallerSet. If there remain any unprocessed call sites in the partial live call graph that could target method M (step 1540=YES), control is passed to step 1516, and processing continues. If all call sites in the partial live call graph that could target M have been processed (step 1540=NO), and if the CallerSet is empty (step 1550=YES), step 1470 is done. However, if the CallerSet is not empty (step 1550=NO), control is passed to step 1140 in FIG. 15B, which is suitably the same as step 1140 in FIGS. 11 and 12, which constructs a connection graph for method M, using currently loaded classes and methods in the analysis. Next, an escape analysis is performed on M's connection graph (step 630) in the same way as is done in the prior art in a static compilation environment. Appropriate allocation mechanisms for each object allocated in M are then determined (step 740), which is suitably the same as prior art method 740 of FIG. 8. Finally, once the objects have been allocated in step 740, previously-analyzed callers of M must be re-analyzed (step 1590).

Figure 16:
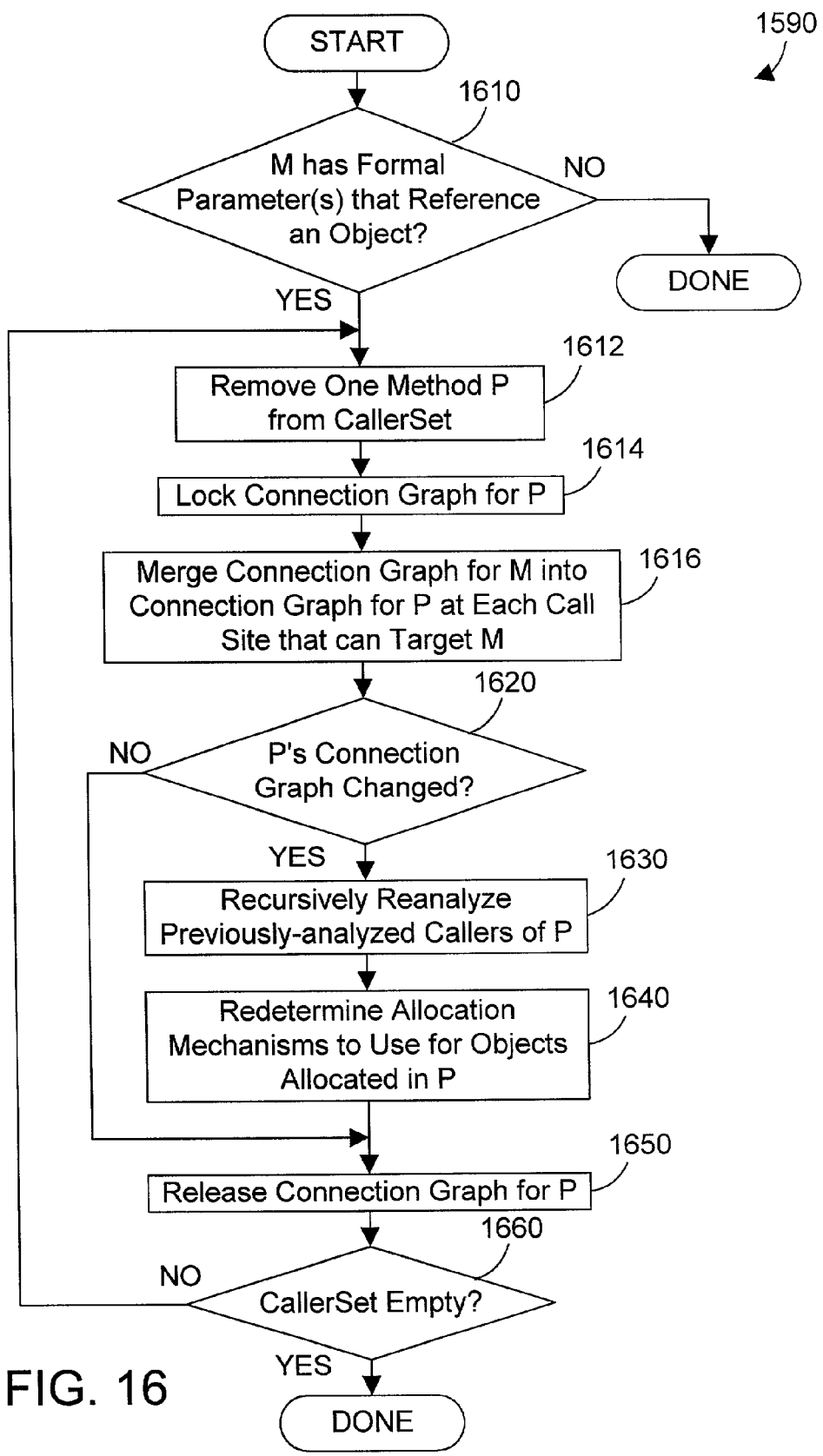
FIG. 16 is a flow diagram of one suitable method in accordance with the preferred embodiments for performing step 1590 of FIG. 15B.

Details of re-analyzing the previously-analyzed callers of M in step 1590 are shown in FIG. 16, which shows how the creation of M's connection graph may cause other methods' connection graphs to change. If M has no formal parameters that reference an object (step 1610=NO), then M cannot affect object allocations in any of its callers, so nothing further need be done. If M has one or more formal parameters that reference an object (step 1610=YES), one method P is removed from the CallerSet (step 1612). The connection graph for P is then locked (step 1614). Locking the connection graph is necessary because P may rarely contain calls to more than one method that is being processed in step 1470 of FIGS. 14 and 15A at the same time. Changes to P's connection graph must therefore be serialized. The connection graph for M is then merged into the connection graph for P at each call site that can target M (step 1616). If the merge operation in step 1616 does not change P's connection graph (step 1620=NO), the connection graph for P is released (step 1650), and the next method in the CallerSet is analyzed if the CallerSet is not empty (step 1660=NO). If the merge operation in step 1616 changes P's connection graph (step 1620=YES), step 1630 recursively calls step 1590 in FIG. 16 on behalf of P. Once this recursive analysis in step 1630 is complete, the allocation mechanisms for objects allocated in P are re-determined (step 1640). Once all methods in the CallerSet have been analyzed (step 1660=YES), step 1590 is done.

Figure 17:
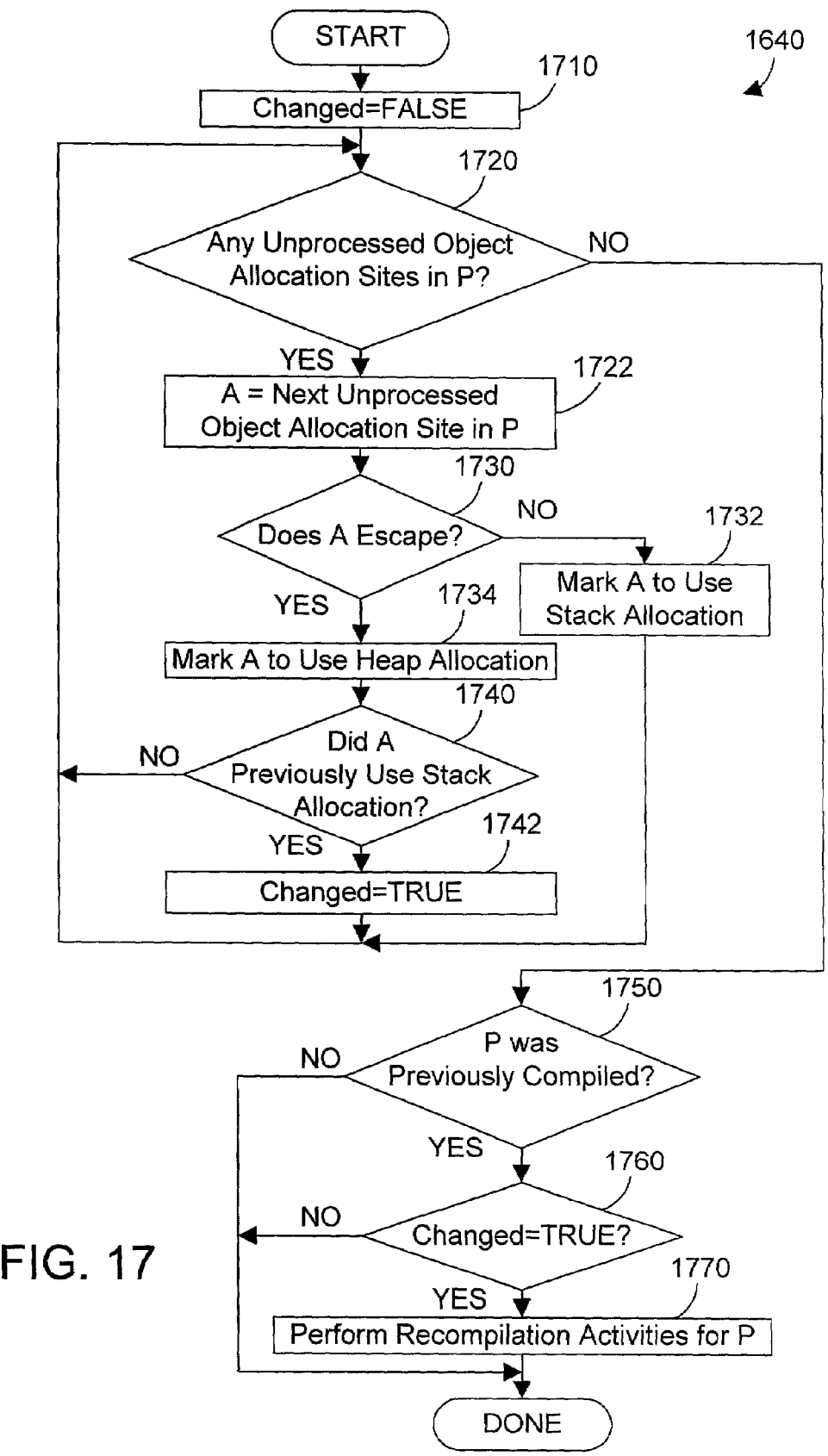
FIG. 17 is a flow diagram of one suitable method in accordance with the preferred embodiments for performing step 1640 of FIG. 16.

The details of re-determining allocation mechanisms to use for objects allocated in P in step 1640 are shown in FIG. 17. The steps in FIG. 17 are used to re-analyze whether objects allocated in P should be allocated on M's invocation stack or on the heap based on the introduction of the new method M. First, a "Changed" flag that has a boolean value is set to a value of false (step 1710). The only way for the "Changed" flag to be set true in step 1742 is if there is an unprocessed object allocation site in P (step 1720=YES) with an unprocessed object allocation site A (step 1722) that escapes (step 1730=YES) and therefore is marked to use heap allocation (step 1734) that previously used stack allocation (step 1740=YES). In other words, the changed flag is only set to true if an object that was previously allocated on a stack should now be allocated on the heap due to the new information from method M. If A still does not escape (step 1730=NO), A is still marked for stack allocation (step 1732), so no change in allocation is necessary.

Once all object allocation sites in P have been processed (step 1720=NO), if P was previously compiled (step 1750=YES), and if the Changed flag was set to True in step 1742 (step 1760=YES), certain recompilation activities for P need to be performed (step 1770). If P was not previously compiled (step 1750=NO), or if the Changed flag is still set to False (step 1760=NO), no such recompilation is required.

Figure 18:
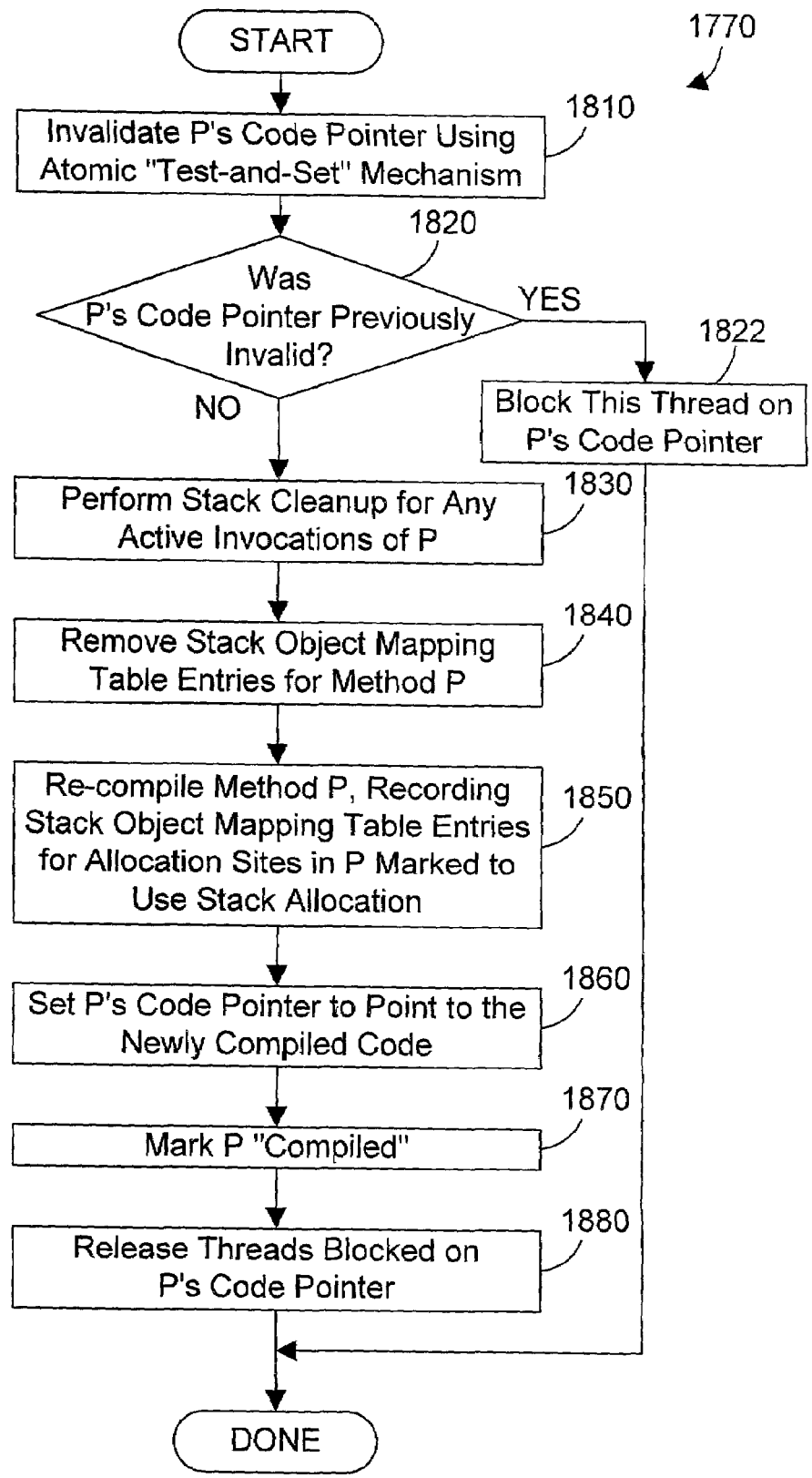
FIG. 18 is a flow diagram of one suitable method in accordance with the preferred embodiments for performing step 1770 of FIG. 17.

Details of the recompilation in step 1770 of FIG. 17 is shown in FIG. 18. First, P's code pointer is invalidated using an atomic test-and-set operation (step 1810). If P's code pointer was previously invalid (step 1820=YES), another thread has control of P, so this thread is blocked on P's code pointer (step 1822). If P's code pointer was not previously invalid (step 1820=NO), stack cleanup must be performed for any active invocations of P (step 1830). Next, entries in the stack object mapping table for method P are removed (step 1840). Method P is then re-compiled, recording stack object mapping table entries for allocation sites in P marked to use stack allocation (step 1850). Each entry contains two pieces of information: the size of the object allocated at this site, and the offset in the stack frame where the object is located. P's code pointer is then set to point to the newly compiled code (step 1860), P is marked "compiled" (step 1870), and any threads blocked on P's code pointer are released (step 1880).

Figure 19:
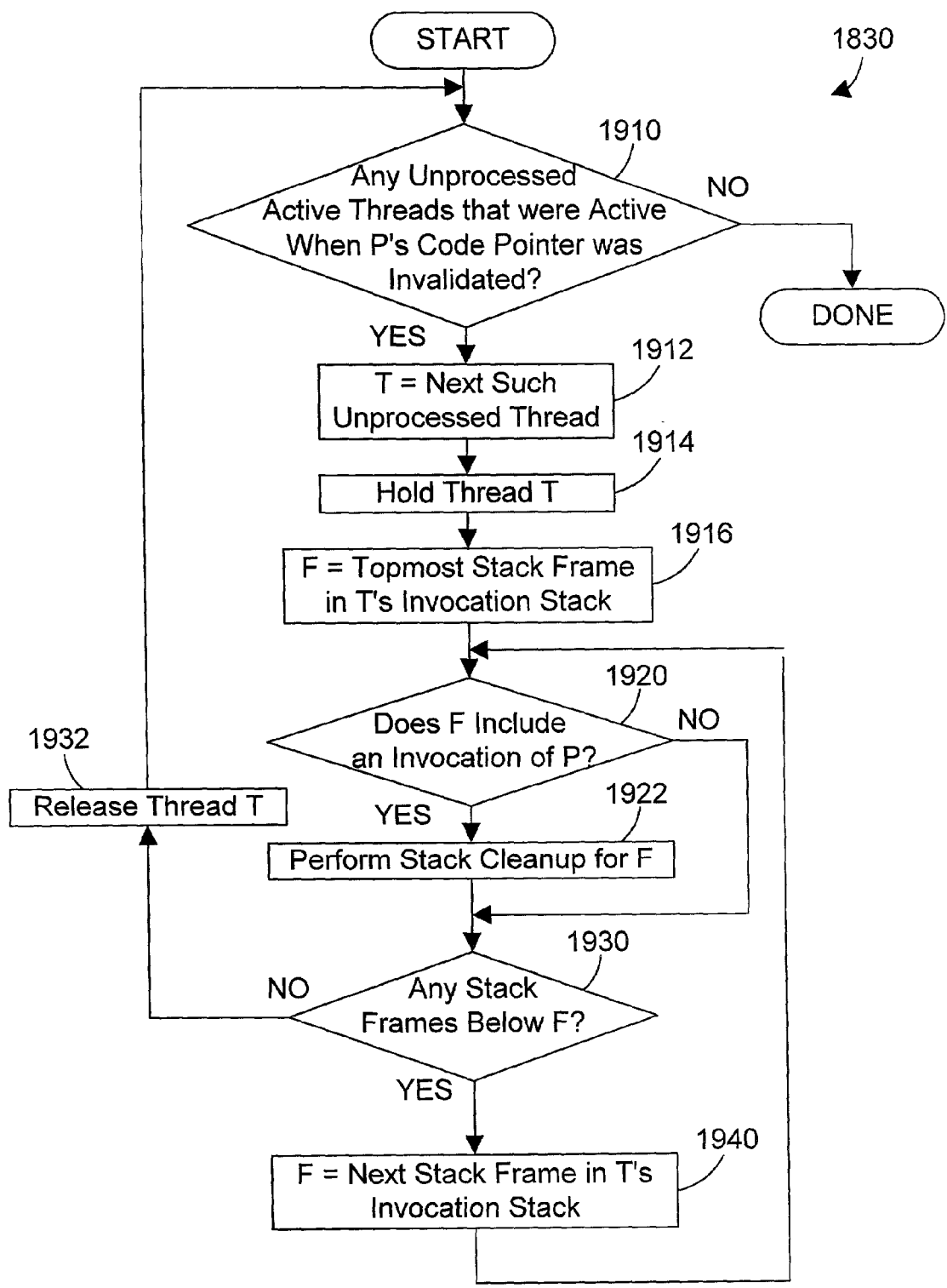
FIG. 19 is a flow diagram of one suitable method in accordance with the preferred embodiments for performing step 1830 of FIG. 18.
Figure 20:
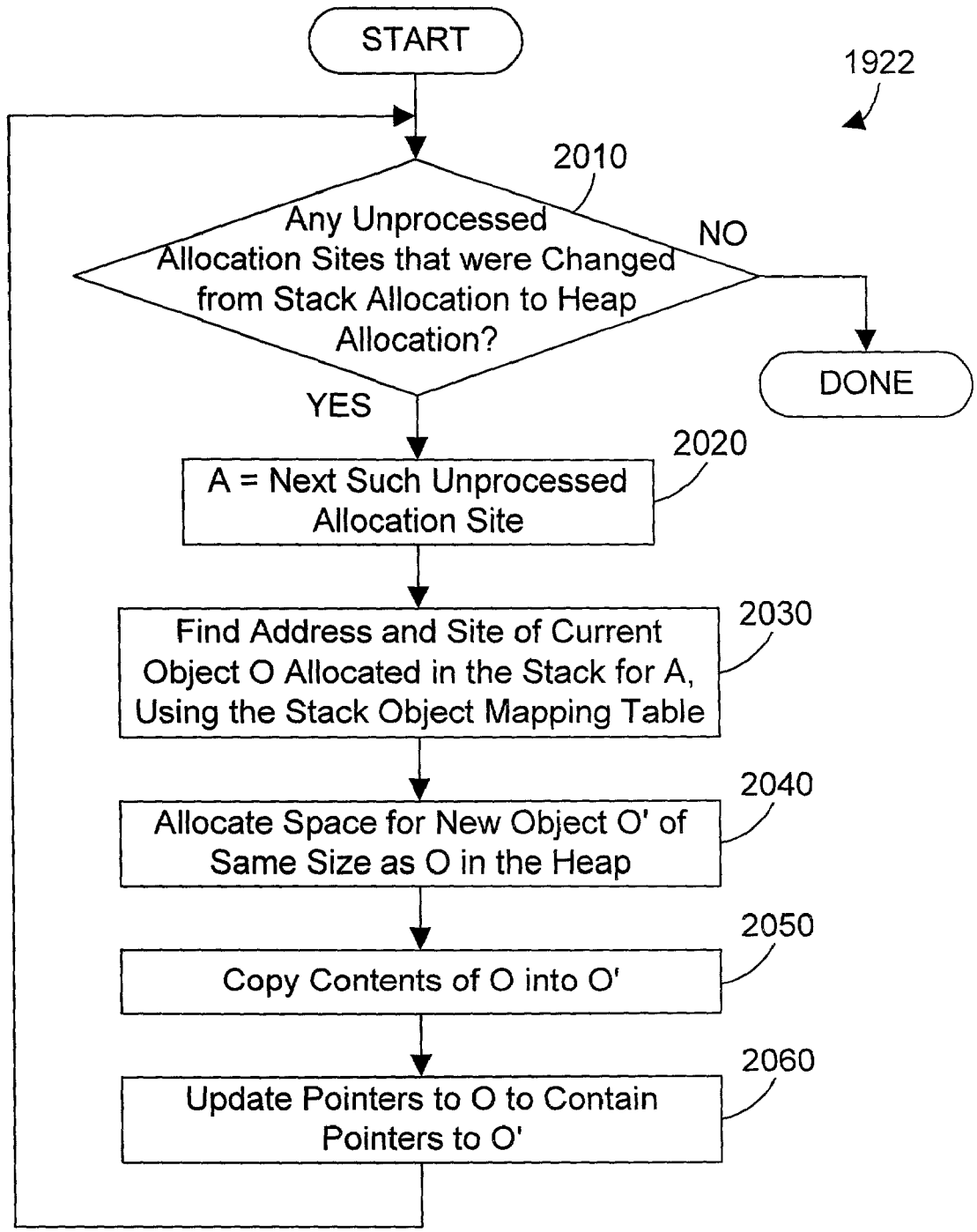
FIG. 20 is a flow diagram of one suitable method in accordance with the preferred embodiments for performing step 1922 of FIG. 19.
Figure 21:
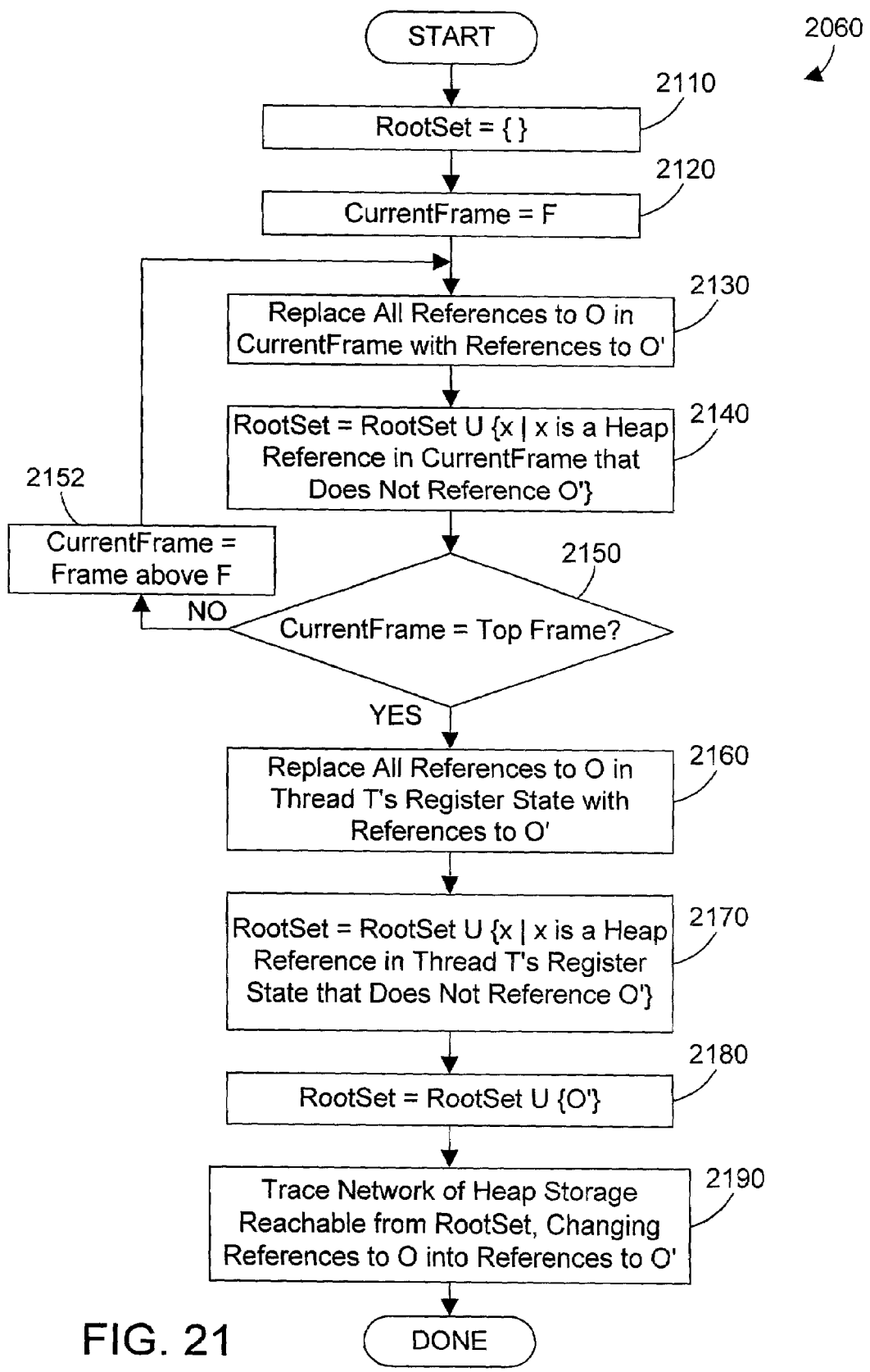
FIG. 21 is a flow diagram of one suitable method in accordance with the preferred embodiments for performing step 2060 of FIG. 20.

Details of the stack cleanup operation 1830 in FIG. 18 are shown in FIG. 19, which forms a loop that processes each thread that was active when P's code pointer was invalidated, because only such threads may have active invocations of P on their stacks. The problem addressed by the methods in FIGS. 19–21 is the problem of one or more threads that may be referencing a stack-allocated object O in their invocation stack frame, and that now need the reference to O to be changed to a new heap object O'. If there are unprocessed active threads that were active when P's code pointer was invalidated (step 1910=YES), one such thread is selected and denoted T (step 1912), and is held so that its stack cannot change until it has been processed (step 1914). The topmost stack frame in T's invocation stack is then denoted F (step 1916). If F includes an invocation of P (step 1920=YES), stack cleanup for F is performed (step 1922). If there are more stack frames below F (step 1930=YES), the next stack frame is assigned to F (step 1940), and control passes to step 1920. This continues until all stack frames below F have been processed (step 1930=NO), at which point thread T is released (step 1932). When there are no more unprocessed active threads that were active when P's code pointer was invalidated (step 1910=NO), step 1830 is done. Step 1830 thus loops through each applicable thread and stack frame for each thread, performing stack cleanup in step 1922 as required.

Details of the stack cleanup in step 1922 are shown in FIG. 20. Stack cleanup is only required for unprocessed allocation sites that were changed from stack allocation to heap allocation (step 2010=YES). The next such allocation site is denoted A (step 2020). Step 2030 finds the address and site of the current object O allocated in the stack for A using the stack object mapping table (step 2030). Space for a new object O' that is the same size as O is then allocated on the heap (step 2040). The contents of O are then copied into O' (step 2050), and all pointers to O are updated to point to O' (step 2060).

The pointers to O may be updated to point to O' using the details for step 2060 shown in FIG. 21. A set variable called RootSet is created and initialized empty (step 2110). Stack frame F is made the CurrentFrame (step 2120). All references to O in CurrentFrame are replaced with references to O' (step 2130). Any heap reference x in the CurrentFrame that does not reference O' is added to the RootSet (step 2140). If the CurrentFrame is not the top frame in the stack (step 2150=NO), CurrentFrame is assigned to the next frame above F (step 2152), and processing continues in step 2130. This continues until the CurrentFrame is the top frame in the invocation stack (step 2150=YES). At this point, all references to O in thread T's register state are replaced with references to O' (step 2160). The heap reference x in thread T's register state that does not reference O' is then added to the RootSet (step 2170), and O' is added to the RootSet (step 2180). Finally, the network of heap storage that is reachable from RootSet is traced, changing all references to O into references to O'.

Figure 22:
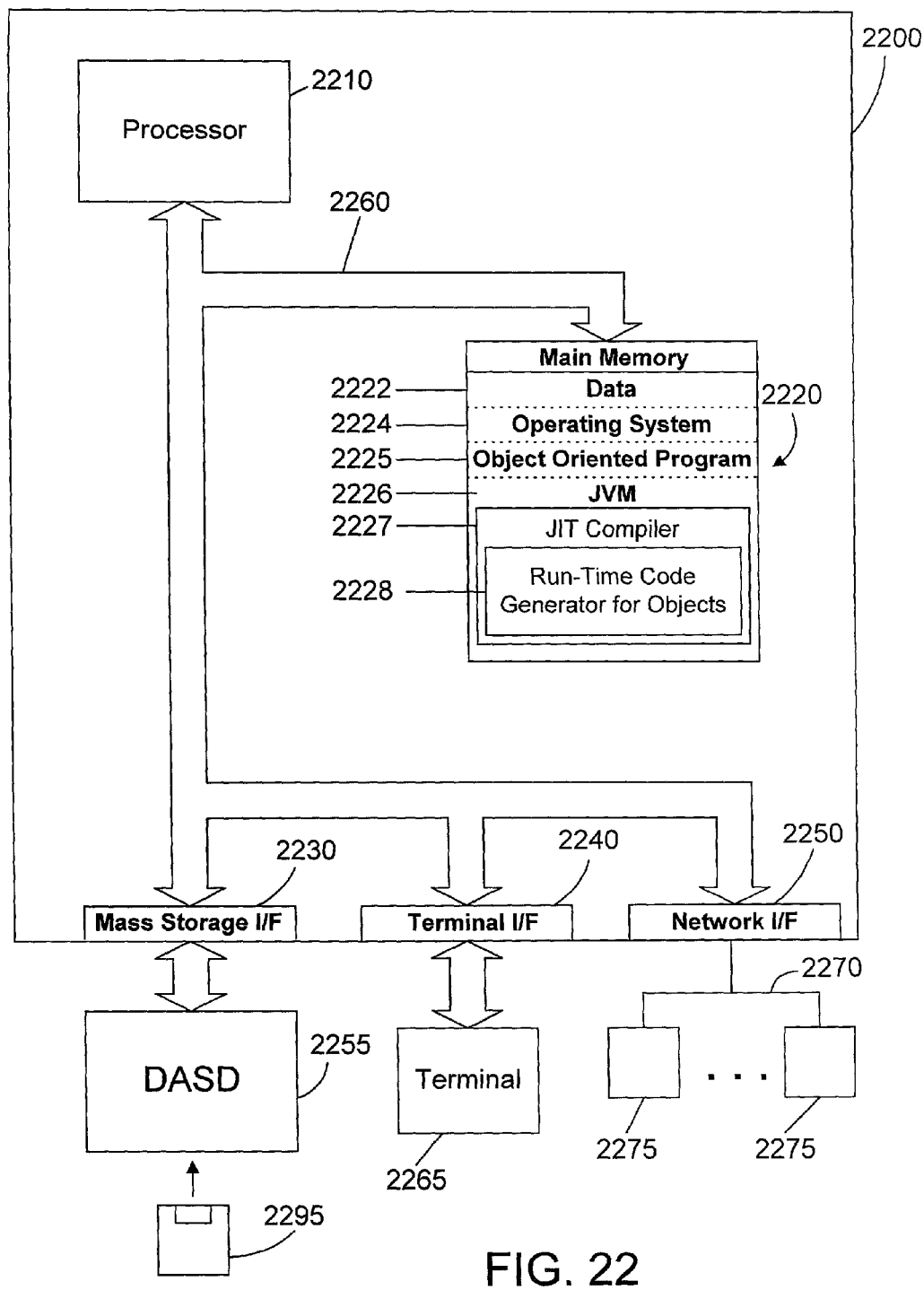
FIG. 22 is a block diagram of an apparatus in accordance with the preferred embodiments.

While the invention thus far has been described as computer-implemented methods, the invention could also be practiced as an apparatus that performs the method steps previously discussed. Referring to FIG. 22, a computer system 2200 in accordance with the preferred embodiment is an IBM iSeries 400 computer system. However, those skilled in the art will appreciate that the mechanisms and apparatus of the present invention apply equally to any computer system, regardless of whether the computer system is a complicated multi-user computing apparatus. a single user workstation, or an embedded control system. As shown in FIG. 22, computer system 2200 comprises a processor 2210, a main memory 2220, a mass storage interface 2230, a terminal interface 2240, and a network interface 2250. These system components are interconnected through the use of a system bus 2260. Mass storage interface 2230 is used to connect mass storage devices (such as a direct access storage device 2255) to computer system 2200. One specific type of direct access storage device 2255 is a floppy disk drive, which may store data to and read data from a floppy disk 2295.

Main memory 2220 in accordance with the preferred embodiments contains data 2222, an operating system 2224, an object oriented program 2225, and a Java Virtual Machine (JVM) 2226. The JVM 2226 executes a just-in-time (JIT) compiler 2227. In the preferred embodiments, JIT compiler 2227 suitably includes a run-time code generator for objects 2228, and provides the dynamic compilation capability discussed herein. Note that JIT compiler 2227 in FIG. 22 is shown to contain the run-time code generator for objects 2228, but this item 2228 could also be provided separate from JIT compiler 2227 within the scope of the preferred embodiments.

Computer system 2200 utilizes well known virtual addressing mechanisms that allow the programs of computer system 2200 to behave as if they only have access to a large, single storage entity instead of access to multiple, smaller storage entities such as main memory 2220 and DASD device 2255. Therefore, while data 2222, operating system 2224, OO program 2225, and JVM 2226 are shown to reside in main memory 2220, those skilled in the art will recognize that these items are not necessarily all completely contained in main memory 2220 at the same time. It should also be noted that the term "memory" is used herein to generically refer to the entire virtual memory of computer system 2200.

Data 2222 represents any data that serves as input to or output from any program in computer system 2200. Operating system 2224 is a multitasking operating system known in the industry as OS/400; however, those skilled in the art will appreciate that the spirit and scope of the present invention is not limited to any one operating system. Object oriented program 2225 is object oriented or object based, and contains one or more statements that instantiate (or create) object oriented objects.

Processor 2210 may be constructed from one or more microprocessors and/or integrated circuits. Processor 2210 executes program instructions stored in main memory 2220. Main memory 2220 stores programs and data that processor 2210 may access. When computer system 2200 starts up, processor 2210 initially executes the program instructions that make up operating system 2224. Operating system 2224 is a sophisticated program that manages the resources of computer system 2200. Some of these resources are processor 2210, main memory 2220, mass storage interface 2230, terminal interface 2240, network interface 2250, and system bus 2260.

Although computer system 2200 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 2210. However, those skilled in the art will appreciate that the present invention applies equally to computer systems that simply use I/O adapters to perform similar functions.

Terminal interface 2240 is used to directly connect one or more terminals 2265 to computer system 2200. These terminals 2265, which may be non-intelligent (i.e., dumb) terminals or fully programmable workstations, are used to allow system administrators and users to communicate with computer system 2200. Note, however, that while terminal interface 2240 is provided to support communication with one or more terminals 2265, computer system 2200 does not necessarily require a terminal 2265, because all needed interaction with users and other processes may occur via network interface 2250.

Network interface 2250 is used to connect other computer systems and/or workstations (e.g., 2275 in FIG. 22) to computer system 2200 across a network 2270. The present invention applies equally no matter how computer system 2200 may be connected to other computer systems and/or workstations, regardless of whether the network connection 2270 is made using present-day analog and/or digital techniques or via some networking mechanism of the future. In addition, many different network protocols can be used to implement a network. These protocols are specialized computer programs that allow computers to communicate across network 2270. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 2295 of FIG. 22) and CD ROM, and transmission type media such as digital and analog communications links.

An example is now presented to illustrate the function of the apparatus and method of the preferred embodiments. FIGS. 23–26 show C++ pseudo-code for four sample classes. The ExampleClass in FIG. 26 is the starting class of the application. When this application is run, the Java Virtual Machine (JVM) goes through its startup activities, then invokes the main( ) method of ExampleClass. For purposes of this example, suppose that each method is interpreted until it has been executed 50 times. We will also assume that there is only one application thread operating in this JVM, so only one thread will be executing methods from these classes, and we ignore processing of classes during JVM startup.

Before it can invoke ExampleClass.main( ), the JVM must load ExampleClass (FIG. 26). ExampleClass is marked "in progress" atomically in step 1410 of FIG. 14. A node representing ExampleClass is then added to the partial class hierarchy graph in step 1430. Note that the partial class hierarchy graph starts out containing only those classes loading during JVM startup, with the ExampleClass being the first application class to be loaded. The java.lang.Class class is one of the classes loaded during startup, as shown by the Class node in FIG. 27. Since there is not an explicit extends clause for ExampleClass, its immediate ancestor in the partial class hierarchy graph is java.lang.Object. The methods in ExampleClass are then considered in arbitrary order, according to steps 1440, 1450 and 1460 of FIG. 14. First, we assume that ExampleClass.exampleMethod( ) is checked. Since the partial live call graph contains only a call out of the JVM that will target ExampleClass.main( )

(ignoring classes loaded and analyzed during JVM startup), there are no call sites in the partial live call graph that can target ExampleClass.exampleMethod( ) directly. The same is true of ExampleClass.doSomeWork( ). On the other hand, there is a call site that can target ExampleClass.main( ), so step 1470 causes the steps of FIGS. 15A and 15B to be executed.

Figure 27:
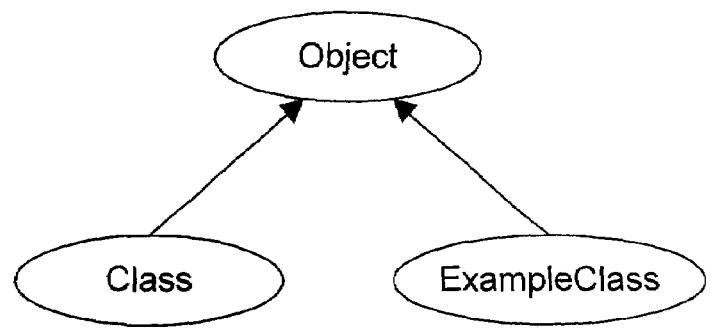
FIG. 27 is a partial class hierarchy graph for the sample classes in FIGS. 23–26 when Class and ExampleClass have been loaded.
Figure 28:
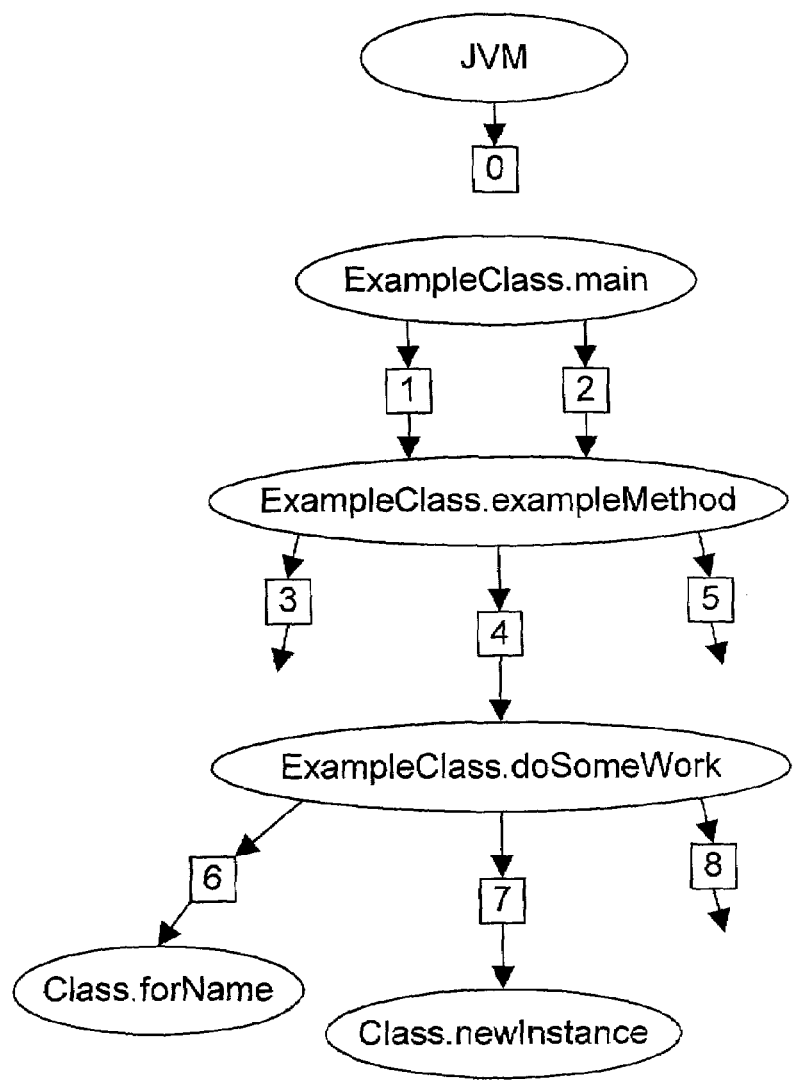
FIG. 28 is a partial live call graph for the sample classes in FIGS. 23–26 that corresponds with the partial class hierarchy graph of FIG. 27.

Step 1510 causes ExampleClass.main( ) to be added to the partial live call graph. Step 1512 adds two call site notes to the partial live call graph for the two calls to exampleMethod( ). Since the only target of these call sites is ExampleClass.exampleMethod( ), arcs from the call sites to ExampleClass.exampleMethod( ) are added to the partial live call graph. Since this is the first time ExampleClass.exampleMethod( ) has become live, nodes representing the three call sites in ExampleClass.exampleMethod( ) are also added to the partial live call graph. The first and third of these have no possible targets in classes loaded so far. For the second, an arc is added to ExampleClass.doSomeWork( ). Again, this method has become live for the first time, so nodes for its call sites are added to the partial live call graph as well, with arcs to possible targets given the classes loaded so far. FIG. 27 shows the partial class hierarchy graph and FIG. 28 shows the partial live call graph to this point.

Referring back to FIG. 15A, step 1514 sets the CallerSet to the empty set. Step 1516 sets P to be the calling method in the JVM, and S to be the call site node that targets the main( ) method (that is, call site 0 in FIG. 28). Step 1520 adds the arc from S to ExampleClass.main( ). Assuming that the JVM calling method was not previously analyzed, the answer to step 1530 is NO, and the answer to step 1540 is NO because there are no other call sites to process. Since CallerSet is empty (step 1550=YES), step 1470 in FIG. 15A is done. When step 1470 in FIG. 14 returns, there are no more unprocessed methods in ExampleClass (step 1440=NO), so ExampleClass is marked as "loaded" (step 1442). No other threads are waiting, so step 1444 does nothing, and the steps for 1060 in FIG. 14 are done.

Figure 29:
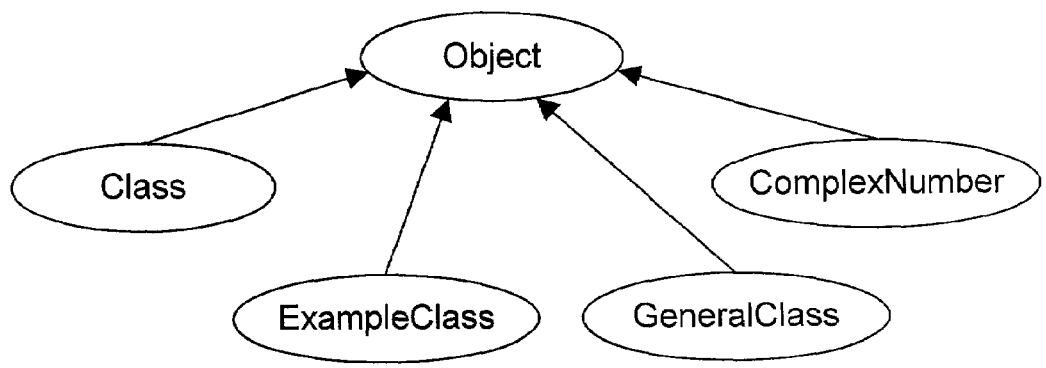
FIG. 29 is a partial class hierarchy graph for the sample classes of FIGS. 23–26 when most of the classes have been loaded.
Figure 30:
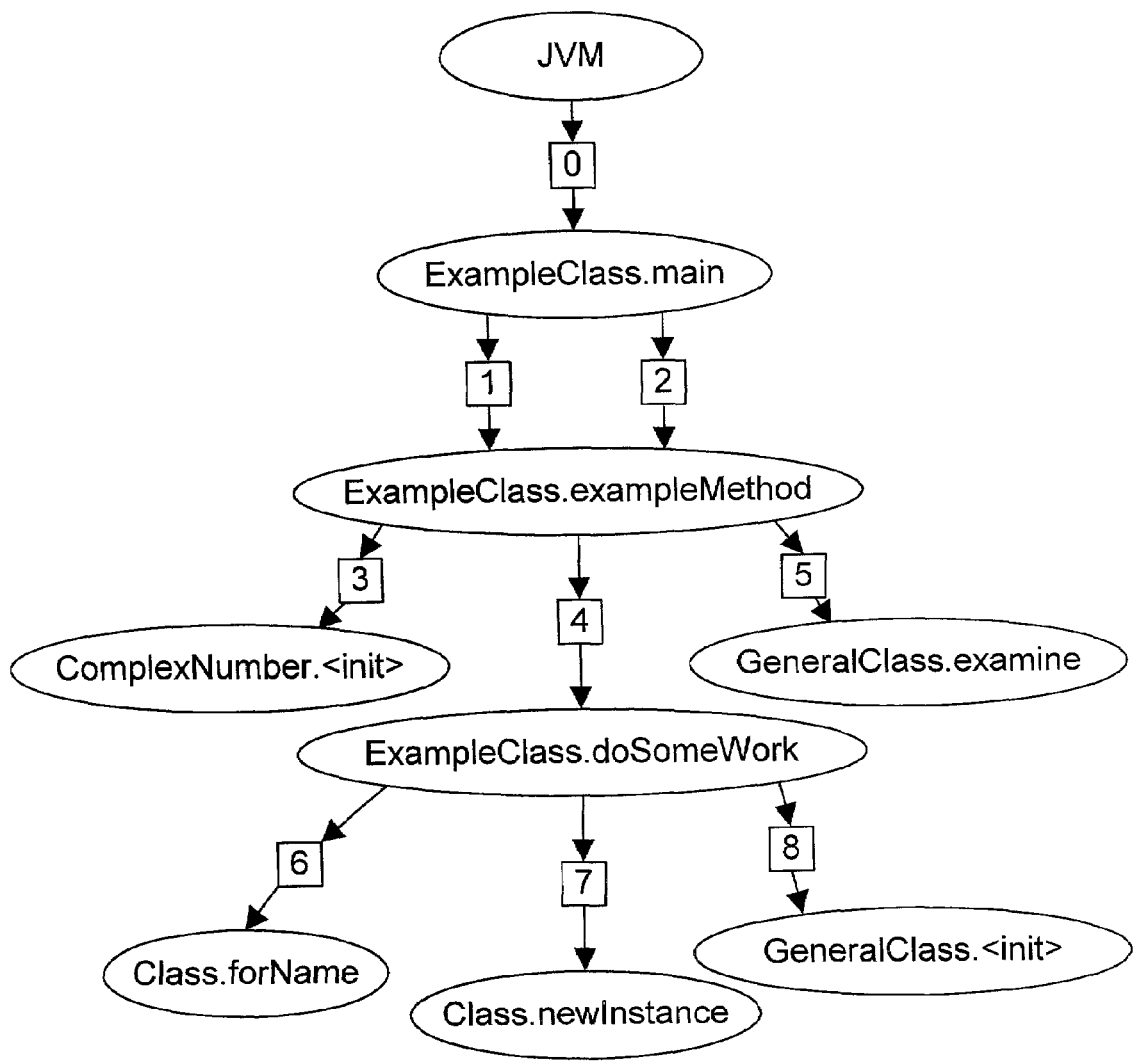
FIG. 30 is a partial live call graph for the sample classes in FIGS. 23–26 that corresponds with the partial class hierarchy graph of FIG. 29.

Normal JVM activity after loading a class includes a linking phase to combine it into the runtime state of the JVM. Part of this activity is verification, which includes resolution of references. Since ExampleClass of FIG. 26 calls methods of the ComplexNumber class of FIG. 23 and GeneralClass of FIG. 24, these two classes must also be loaded in a manner similar to what was described above for ExampleClass. Repeating the appropriate steps in FIGS. 14 and 15 results in the partial control hierarchy graph as shown in FIG. 29 and the partial live call graph as shown in FIG. 30.

At this point, execution of ExampleClass.main( ) begins in the JVM's interpreter. The nested loops in this method cause ExampleClass.exampleMethod( ) to be executed 10,000 times. After it has executed 50 times, the JVM determines that exampleMethod( ) should be compiled according to the steps 1050 shown in FIG. 11. Step 1110 marks exampleMethod( ) as "being compiled", assuming that exampleMethod( ) was not previously marked as "being compiled" (step 1120=NO). Since there has not yet been a connection graph constructed for exampleMethod( ) (step 1130=NO), a connection graph for exampleMethod( ) is constructed according to the steps 1140 shown in FIG. 12, which cause the connection graph to be built according to prior art rules that are modified in accordance with the preferred embodiments to ensure that called methods in the partial live call graph have connection graphs built first. The primary difference between the escape analysis of the prior art and the escape analysis of the preferred embodiments is that the escape analysis of the preferred embodiments uses partial class hierarchy graphs and partial live call graphs to mark allocation instructions as no escape, global escape, or arg escape, whereas the prior art requires a full class hierarchy graph and a full live call graph to perform escape analysis. Connection graphs are produced in step 1140 of FIG. 12 for ComplexNumber.<init>( ) and GeneralClass.<init> (which are empty); GeneralClass.examine( ), as shown in FIG. 31; ExampleClass.doSomeWork( ), as shown in FIG. 32; and ExampleClass.exampleMethod( ), as shown in FIG. 33.

The reader is referred to Choi et al. for a full description of connection graphs, but a few explanatory notes are in order. In FIGS. 31–33, a box represents a parameter or variable that contains object references, and contains the name of that parameter or variable. A circle represents an object allocation instruction. If the circle is dashed, the instruction where the object is allocated is unknown; otherwise the circle is labeled with the instruction. An arc labeled "P" is a points-to arc, meaning the source variable can contain a reference pointer to the objects allocated at the target allocation site. A special node labeled with the "bottom" symbol ($\perp$) is used to represent all memory locations outside the current method; if there is a directed path from the bottom node to an object allocation instruction, that means that objects allocated at that instruction are global escape.

Escape analysis is now performed on the connection graph of ExampleClass.exampleMethod( ) in step 1142 of FIG. 11, preferably using prior art techniques of escape analysis that are modified in accordance with the preferred embodiments to only consider information that is in the connection graph without concern for the fact that not all of the classes have been loaded yet. Applying the steps in method 740 (FIG. 8) to the connection graph in FIG. 33, we determine that allocation site A1 in FIG. 26 does not escape (step 820=NO), so object cn is marked for stack allocation (step 830). There are no more allocation instructions (step 850=NO), so method 740 is done, and control is returned to step 1144 of FIG. 11, which determines from the fact that cn is marked for stack allocation that cn will be allocated on the invocation stack of ExampleClass.exampleMethod( ).

ExampleClass.exampleMethod( ) is then re-compiled (step 1150). Since there is an allocation site marked for stack allocation, an entry is added to the stack object mapping table for this method, as shown in FIG. 34. Since integers consume four bytes each, the size of the ComplexNumber class instance is eight bytes. The offset in the stack frame is arbitrarily assumed to be 64 bytes. The method's code pointer is then set to the newly compiled code (step 1160), it is marked "compiled" (step 1170), and since there are no other threads to block on the code pointer (step 1180), the steps in method 1050 of FIG. 11 are done.

The code in ExampleClass.main( ) continues to be executed, with the newly compiled code used for subsequent execution of ExampleClass.exampleMethod( ). Now, consider what happens during each execution of that method. A new ComplexNumber object is constructed on the stack (at offset 64), and then calls are made to doSomeWork( ) and examine( ). Since, in the doubly-nested loop in main( ), j is always positive, doSomeWork( ) always follows the "else" clause, setting the gCls field to point to a new GeneralClass object, so that gCls.examine( ) results in a call to GeneralClass.examine( ). For the purpose of simplicity in the discussion herein, we ignore the fact that doSomeWork( ) and GeneralClass.examine( ) will also be compiled in the same manner described above. Now, at the end of the doubly-nested loop in main( ), another call to exampleMethod( ) is made, this time with both parameters negative. In the resulting call to doSomeWork( ), the call to x.imagpart( ) returns −1. This causes the method Class.forName( ) to be executed. This method (part of the standard Java Development Kit) causes the class SpecificClass of FIG. 25 to be loaded at runtime. Since the JVM is loading a class, the steps in FIG. 14 are executed.

Figure 35:
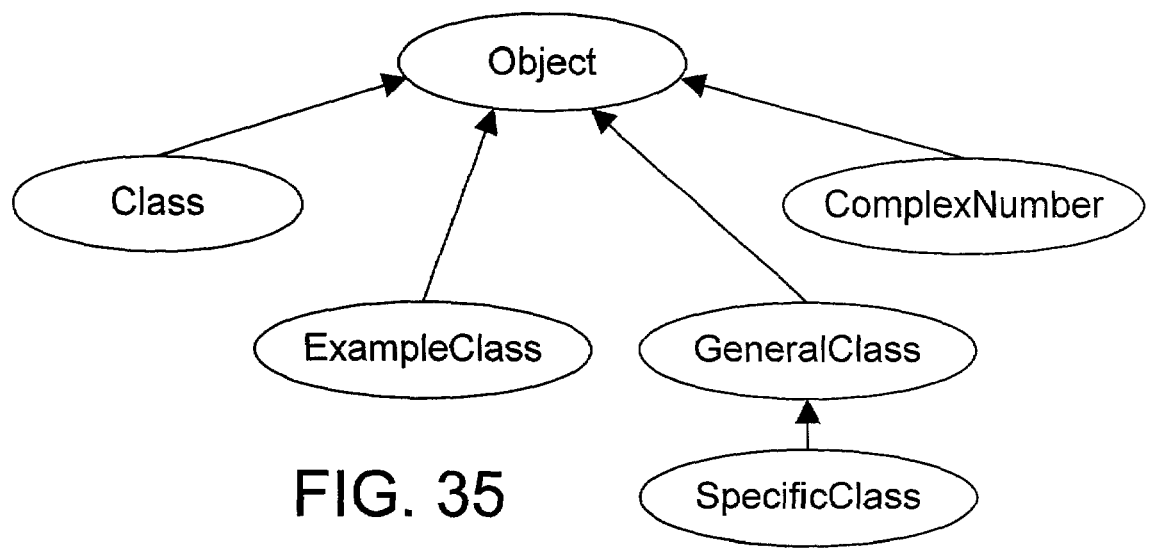
FIG. 35 is a partial class hierarchy graph for the sample classes of FIGS. 23–26 when all of the classes have been loaded.
Figure 38:
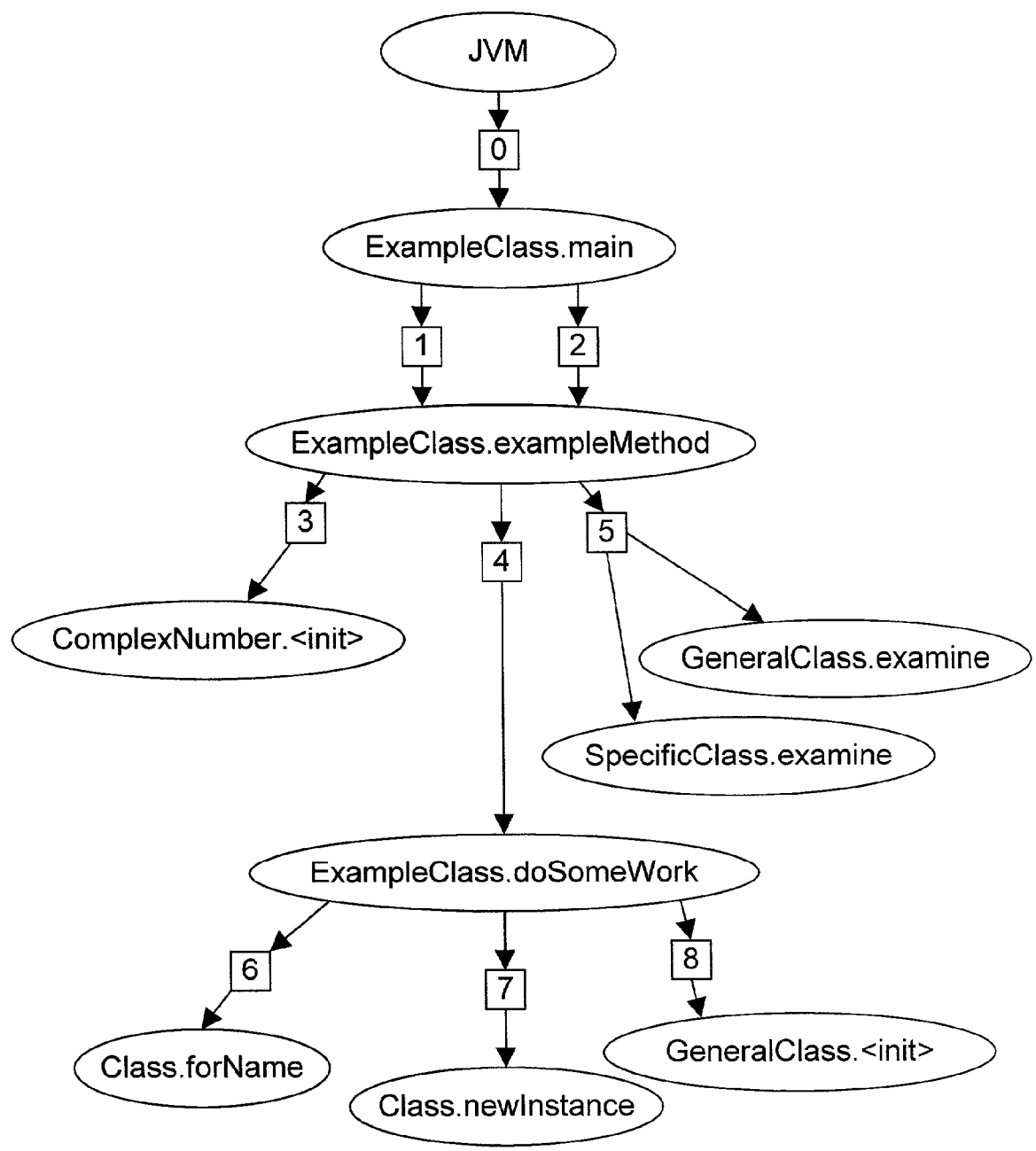
FIG. 38 is a partial live call graph that corresponds with the partial class hierarchy graph of FIG. 35.

Step 1410 marks SpecificClass "in progress". Assuming that SpecificClass was not previously marked "in progress" (step 1420=NO), SpecificClass is then added to the partial class hierarchy graph (step 1430), resulting in the partial class hierarchy graph as shown in FIG. 35. There is an unprocessed method (step 1440=YES), so M is assigned to the next unprocessed method in SpecificClass (step 1450), namely SpecificClass.examine( ). There is a single call site in the partial live call graph of FIG. 30 (#5) that could target SpecificClass.examine( ) (step 1460=YES), so the steps in 1470 in FIGS. 15A and 15B are executed. A node for the SpecificClass.examine( ) method is added to the partial live call graph (step 1510). SpecificClass.examine( ) does not contain any call sites, so step 1512 has no effect. CallerSet is set to the empty set in step 1514. Step 1516 sets P to ExampleClass.exampleMethod( ) and S to call site #5 in the partial live call graph of FIG. 30. An arc from call site #5 to SpecificClass.examine( ) is added to the partial live call graph (step 1520), as shown in FIG. 38. Since ExampleClass.exampleMethod( ) has a previously-constructed connection graph (step 1530=YES), ExampleClass.exampleMethod( ) is added to CallerSet (step 1532). This the last relevant call site (step 1540=NO), and CallerSet is not empty (step 1550), so control is passed to step 1140 in FIG. 15B, which builds the connection graph for SpecificClass.examine( ). The resulting connection graph is shown in FIG. 36.

Figure 36:
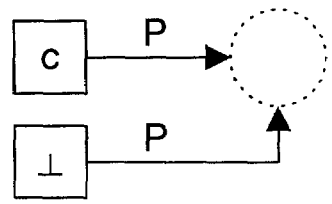
FIG. 36 is a connection graph for the GeneralClass.examine( ) method after loading SpecificClass.
Figure 37:
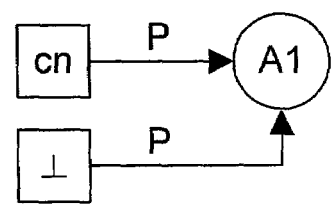
FIG. 37 is a connection graph for the ExampleClass.exampleMethod( ) method after loading SpecificClass.

Returning now to step 630 in FIG. 15B, an escape analysis is performed on the connection graph of FIG. 36. No call sites are present, so steps 630 and 740 in FIG. 15B have no effect. Finally, the previously-analyzed callers of SpecificClass.examine( ) are reanalyzed (step 1590) according to the steps in FIG. 16. SpecificClass.examine( ) does have a formal parameter that references an object, namely c, so step 1610=YES. CallerSet contains one method, so that method ExampleClass.exampleMethod( ) is removed from it (step 1612). The connection graph for that method is locked (step 1614), and then the connection graph for SpecificClass.examine( ) is merged into it (step 1616). The resulting connection graph is shown in FIG. 37. Since the connection graph of FIG. 36 is not identical to the connection graph of FIG. 37, step 1620=YES, and step 1630 then recursively executes the steps in 1590 of FIG. 16 on behalf of ExampleClass.exampleMethod( ), which has no formal parameters that reference objects (step 1610=NO), so control returns immediately. Step 1640 is then executed, which performs the steps in FIG. 17 to redetermine allocation mechanisms for objects allocated in ExampleClass.exampleMethod( ).

The boolean variable Changed is set to false (step 1710). Since there is an object allocation site in ExampleClass.exampleMethod( ), step 1720=YES and A is set to allocation site A1 (step 1722). Since there is a path from the "bottom" node to the node for A1 (see FIG. 37), A1 escapes (step 1730=YES), and A1 is marked to use heap allocation (step 1734). Since A1 was previously marked to use stack allocation (step 1740=YES), the variable Changed is set to True (step 1742). At this point there are no more unprocessed object allocation sites in ExampleClass.exampleMethod( ) (step 1720=NO). ExampleClass.exampleMethod( ) was previously compiled (step 1750=YES), and Changed=True (step 1760=YES), so the steps in method 1770 in FIG. 18 are invoked to perform recompilation activities for exampleMethod( ).

Figure 39:
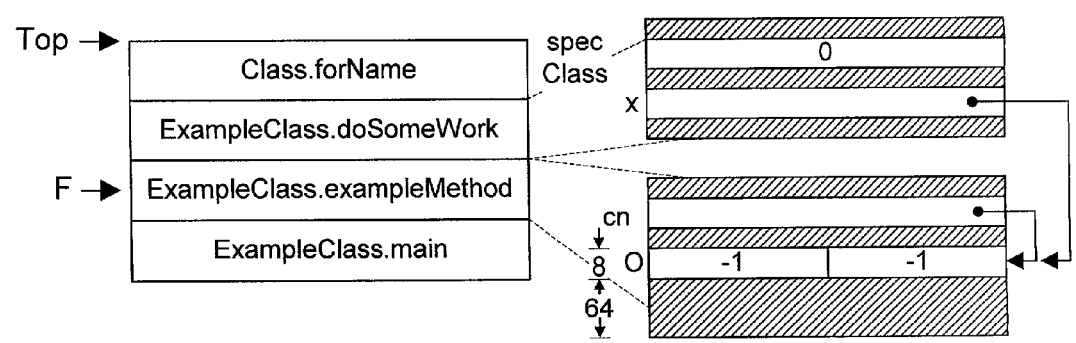
FIG. 39 is a block diagram showing invocation stack frames for two methods on an invocation stack.

Step 1810 invalidates the code pointer for exampleMethod( ) (step 1810), assuming that it was not previously invalidated (step 1820=NO). The steps in FIG. 19 are then invoked to perform stack cleanup 1830 for active invocation of exampleMethod( ). There is one active thread that we care about (step 1910=YES), so T is set to that thread (step 1912), and that thread is held (step 1914). At this point the state of the thread is illustrated in FIG. 39. In step 1916, F is set to point to the topmost stack frame (the frame marked Class.forName). F does not include an invocation of ExampleClass.exampleMethod( ) (step 1920=NO), and there are more stack frames below F (step 1930=YES), so F is set to point to the frame marked ExampleClass.doSomeWork (step 1940). This is not an invocation of ExampleClass.exampleMethod( ) (step 1920=NO), and there are more frames below F (step 1930=YES), so F is set to point to the frame marked ExampleClass.exampleMethod( ) (step 1940). This stack frame contains an invocation of ExampleClass.exampleMethod( ) (step 1920=YES), so the steps 1922 in FIG. 20 are invoked to perform the required stack cleanup.

Figure 40:
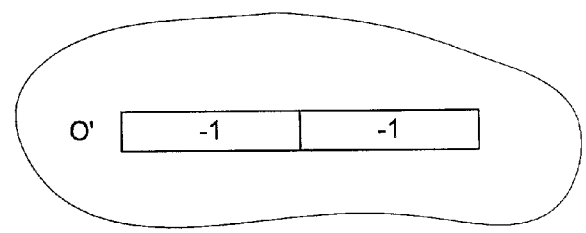
FIG. 40 is a block diagram showing a new object O' that has been allocated from the heap.

There is an allocation site that was changed from stack allocation to heap allocation (step 2010=YES), so A is set to allocation site A1 in step 2020. Looking up A1 in the stack object mapping table of FIG. 34, we find a size of 8 and an offset of 64 (step 2030). FIG. 39 illustrates how this is used to find the object O allocated by A1 in stack frame F. Steps 2040 and 2050 create a copy of O in the garbage-collected heap, labeled O', represented in FIG. 40. The steps of 2060 in FIG. 21 are then performed to update any pointers to O so that they point to O'.

Figure 41:
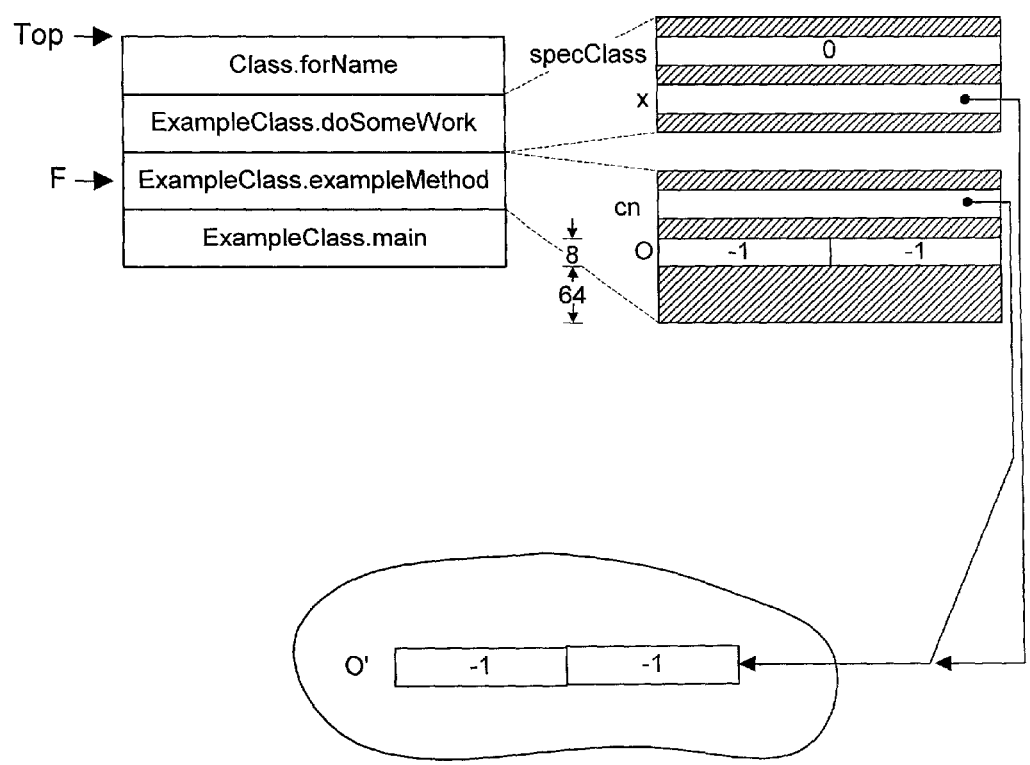
FIG. 41 is a block diagram showing how the references to O in the invocation stack frames of FIG. 40 have been changed to point to O' in accordance with the preferred embodiments.

Step 2110 sets RootSet to the empty set, and step 2120 sets CurrentFrame to point to frame F (the invocation of ExampleClass.exampleMethod( )). This frame contains one reference to O, namely in reference variable cn, so this is changed to point to O' (step 2130). There are no other heap references in frame F, so step 2140 does nothing. F is not the top frame (step 2150=NO), so CurrentFrame is set to the frame labeled ExampleClass.doSomeWork( ) (step 2152). The parameter x contains a reference to O, so this is changed to point to O' (step 2130). There is one other potential heap reference variable in CurrentFrame, namely specClass; however, specClass has not yet been assigned to, so it has a de facto value of zero, and therefore step 2140 has no effect. CurrentFrame is not the top frame (step 2150=NO), so CurrentFrame is set to the invocation frame for Class.forName (step 2152). This frame contains no references to O, so step 2130 has no effect. We will assume that step 2140 has no effect, for the sake of simplicity. CurrentFrame is now the top frame (step 2150=YES). We next investigate whether the current thread has any references to O in its physical hardware register state. Since the registers have to do with the topmost stack frame, and we know there are no references to O in that stack frame, there are also no references in the thread's register state, so step 2160 has no effect. Again, assume that step 2170 has no effect also for simplicity. Step 2180 then sets RootSet to be the set consisting only of O'. In step 2190, we then trace from the RootSet to find all reachable object references that point to O. In this case, O' is the only member of RootSet, and O' does not contain any object references, so this step also has no effect. The result of the changes from steps 2060 in FIG. 21 is illustrated in FIG. 41.

The method 2060 in FIG. 21 is then complete, so we return to step 2010 in FIG. 20. There are no unprocessed allocation sites that change from stack allocation to heap allocation (step 201 0=NO), so we return to FIG. 19. There is another stack frame below F (step 1930=YES), so F is set to the frame marked ExampleClass.main (step 1940). This is not an invocation of ExampleMethod( ) (step 1920=NO), and there are no more stack frames below F (step 1930=NO), so the thread has been cleaned up and is allowed to proceed (step 1932). There are no more threads to clean up (step 1910=NO), so we return to FIG. 18. The stack object mapping table entries for exampleMethod( ) are then removed in step 1840. Step 1850 then recompiles exampleMethod( ). Since there are no stack allocations remaining in that method, the stack object mapping table for exampleMethod( ) remains empty. The code pointer for the method is then set to the newly compiled code (step 1860), and it is marked "compiled" (step 1870). Step 1880 has no effect since no threads are blocked, and we return to FIG. 17, which returns us immediately to FIG. 16. We are through modifying the connection graph, so step 1650 releases the lock on the connection graph. CallerSet is now empty (step 1660=YES), which returns us to FIG. 15B after step 1590, which returns us to FIG. 14 after step 1470. There are no unprocessed methods in SpecificClass (step 1440=NO), so SpecificClass is marked "loaded" (step 1442). No threads are blocked, so step 1444 has no effect. We are now finished with the effects of loading this new class.

Note the effect if this cleanup in FIGS. 14–21 had not taken place. The variable gCls will next be set to point to a new instance of SpecificClass, so the upcoming call to gCls.examine( ) in exampleMethod( ) will resolve to SpecificClass.examine( ). The effect of this is to copy the pointer in cn into a global variable. If the stack cleanup had not been done, cn would point into the invocation stack, and the object pointed to would cease to exist even while a pointer to it existed in a global variable. The stack cleanup ensures that cn points into the heap instead, so that the object will not be collected until all pointers to it disappear.

The preferred embodiments disclosed herein provide a significant advance over the prior art by allowing some variables to be allocated by a dynamic compiler on the invoking method's invocation stack if certain conditions are met. Allocation decisions are made based on the classes that have been loaded so far. As each subsequent class is loaded, its effects on the previous stack allocations are examined. If loading a class causes the allocation for an object to change from stack allocation to heap allocation, certain cleanup procedures are followed to assure that all references to the old object on the stack are changed to point to the new object on the heap. In this manner, an object oriented program running in a dynamic compilation environment can benefit from the performance increase that results from optimizations of having objects allocated on a method's invocation stack.

The cleanup procedures from making certain assumptions about classes that have not yet been loaded result in a performance penalty in the dynamic compiler. However, the frequency of these clean-up procedures may be minimized by introducing criteria for determining when to commence the capability of allocating objects on an invocation stack. For example, a run-time compiler could wait until some preset number of classes (such as 100) is loaded before allowing stack allocation. By selecting appropriate criteria for determining when to begin stack allocation, the frequency of any cleanup operations will be minimized, with the result being a net improvement in the run-time performance of the code.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims. For example, while the preferred embodiments are described as having practical application to the allocation of Java objects, the preferred embodiments are not limited to any particular object oriented language.

What is claimed is:

1. An apparatus comprising:
   at least one processor;
   a memory coupled to the at least one processor;
   an object oriented program residing in the memory comprising a plurality of instructions; and
   a dynamic compiler residing in the memory and executed by the at least one processor, the dynamic compiler being invoked during execution of the object oriented program, the dynamic compiler allocating at least one object in the object oriented program to an invocation stack frame for a method that allocates the at least one object, the dynamic compiler comprising:
      an escape analysis mechanism that marks each instruction that allocates a new object as one of global escape, no escape, and arg escape based on information available from previously-loaded classes that are part of the object oriented program; and
      an object allocation mechanism that allocates at least one object that is created by an instruction marked as no escape by the escape analysis mechanism to an invocation stack frame for a method that allocates the object;
   wherein the dynamic compiler analyzes each class as it is loaded to determine whether the newly-loaded class affects the allocation of an object by the object allocation mechanism to the invocation stack frame, and if so, the dynamic compiler changes the allocation of the object to a heap.

2. An apparatus comprising:
   at least one processor;
   a memory coupled to the at least one processor;
   an object oriented program residing in the memory comprising a plurality of instructions; and
   a dynamic compiler residing in the memory and executed by the at least one processor, the dynamic compiler being invoked during execution of the object oriented program, the dynamic compiler allocating at least one object in the object oriented program to an invocation stack frame for a method that allocates the at least one object,
   wherein the dynamic compiler changes the allocation of the object from the invocation stack frame to a heap due to information that becomes available from at least one class that is loaded after the dynamic compiler allocates the at least one object to the invocation stack frame.

3. The apparatus of claim 2 wherein the dynamic compiler changes at least one pointer to the object allocated on the invocation stack to point to an object allocated on the heap as a result of information that becomes available as more classes that are part of the object oriented program are loaded.

4. An apparatus comprising:
   at least one processor;
   a memory coupled to the at least one processor;
   an object oriented program residing in the memory comprising a plurality of instructions;
   a portion of the object oriented program that is selected for dynamic compilation;
   a dynamic compiler residing in the memory and executed by the at least one processor, the dynamic compiler being invoked during execution of the object oriented program, the dynamic compiler comprising:
      an escape analysis mechanism that marks each instruction that allocates a new object as one of global escape, no escape, and arg escape based on information available from classes that are part of the object oriented program that have been previously loaded at run-time; and
      an object allocation mechanism that allocates at least one object that is created by an instruction marked as no escape by the escape analysis mechanism to an invocation stack frame for a method that allocates the object;
   wherein the dynamic compiler changes the allocation of the object from the invocation stack frame to a heap due to information that becomes available from at least one class that is loaded after the dynamic compiler allocates the at least one object to the invocation stack frame.

5. A method for allocating objects to memory in an object oriented program during dynamic compilation of a portion of the object oriented program while the object oriented program is executing, the method comprising:
   (A) determining whether compilation of the portion is needed;
   (B) if compilation of the portion is needed:
      (B1) analyzing each instruction in the portion that allocates a new object;
      (B2) allocating at least one object that is created by an instruction to an invocation stack frame for a method that allocates the at least one object; wherein acts (B1) and (B2) comprise:
         marking each instruction in the portion that allocates a new object as one of global escape, no escape, and arg escape based on information available from classes that are part of the object oriented program that have been previously loaded at run-time; and
         allocating at least one object that is created by an instruction marked as no escape by the escape analysis mechanism to an invocation stack frame for a method that allocates the at least one object, and
      wherein the dynamic compiler analyzes each class as it is loaded to determine whether the newly-loaded class affects the allocation of an object to the invocation stack frame, and if so, changing the allocation of the object to a heap.

6. The method of claim 5 wherein act (A) comprises determining whether a method in the portion has been executed a number of times equal to or greater than a predetermined threshold value.

7. A method for allocating objects in an object oriented program to memory, the method comprising:
   loading a plurality of classes that are part of the object oriented program;
   executing code from at least one of the plurality of loaded classes;
   determining whether dynamic compilation of a portion of the object oriented program is needed;
   if dynamic compilation of the portion is needed, allocating at least one object to an invocation stack frame for a method that allocates the at least one object;
   analyzing compiled code as each subsequent class in the object oriented program is loaded; and
   changing the allocation of the at least one object from the invocation stack frame to a heap.

8. A program product comprising:
   a dynamic compiler that is invoked during execution of an object oriented program, the dynamic compiler allocating at least one object in the object oriented program to an invocation stack frame for a method that allocates the at least one object, wherein the dynamic compiler comprises:
      an escape analysis mechanism that marks each instruction that allocates a new object as one of global escape, no escape, and arg escape based on information available from previously-loaded classes that are part of the object oriented program; and
      an object allocation mechanism that allocates at least one object that is created by an instruction marked as no escape by the escape analysis mechanism to an invocation stack frame for a method that allocates the at least one object;
   wherein the dynamic compiler analyzes each class as it is loaded to determine whether the newly-loaded class affects the allocation of an object by the object allocation mechanism to the invocation stack frame, and if so, the dynamic compiler changes the allocation of the object to a heap; and
   recordable media bearing the dynamic compiler.

9. A program product comprising:
   (A) a dynamic compiler that compiles a portion of an object oriented program, the dynamic compiler being invoked during the execution of the object oriented program, the dynamic compiler comprising:
      (A1) an escape analysis mechanism that marks each instruction that allocates a new object as one of global escape, no escape, and arg escape based on information available from classes that are part of the object oriented program that have been previously loaded at run-time;
      (A2) an object allocation mechanism that allocates at least one object that is created by an instruction marked as no escape by the escape analysis mechanism to an invocation stack frame for a method that allocates the object,
      wherein the dynamic compiler changes the allocation of the object from the invocation stack frame to a heap due to information that becomes available from at least one class that is loaded after the dynamic compiler allocates the at least one object to the invocation stack frame; and
   (B) recordable media bearing the dynamic compiler.

10. A program product comprising:
   (A) a dynamic compiler that compiles a portion of an object oriented program, the dynamic compiler being invoked during the execution of the object oriented program and allocating at least one object in the object oriented program to an invocation stack frame for a method that allocates the at least one object, wherein the dynamic compiler changes the allocation of the object from the invocation stack frame to a heap due to information that becomes available from at least one class that is loaded after the dynamic compiler allocates the at least one object to the invocation stack frame; and
   recordable media bearing the dynamic compiler.

* * * * *